United States Patent [19]
Kubo et al.

[11] Patent Number: 6,014,457
[45] Date of Patent: Jan. 11, 2000

[54] IMAGE PROCESSING APPARATUS

[75] Inventors: Masahiko Kubo; Nobuyuki Kato; Koichiro Shinohara; Masahiro Takamatsu; Kazuhiro Iwaoka, all of Nakai-machi, Japan

[73] Assignee: Fuji Xerox, Co., Ltd., Tokyo, Japan

[21] Appl. No.: 08/958,300

[22] Filed: Oct. 27, 1997

[30]   Foreign Application Priority Data

Nov. 1, 1996   [JP]   Japan .................................. 8-307065

[51] Int. Cl.$^7$ ........................................................ G06K 9/00
[52] U.S. Cl. ............................ 382/167; 358/518; 358/520
[58] Field of Search .................................. 382/162, 167; 358/500, 501, 515, 518, 520, 5

[56]   References Cited

U.S. PATENT DOCUMENTS

| | | | |
|---|---|---|---|
| 5,245,417 | 9/1993 | Hibi et al. .............................. | 358/515 |
| 5,430,525 | 7/1995 | Ohta et al. .............................. | 355/201 |
| 5,559,604 | 9/1996 | Arai ........................................ | 356/402 |
| 5,724,442 | 3/1998 | Ogatsu et al. .......................... | 382/167 |
| 5,729,360 | 3/1998 | Kita et al. ............................... | 358/500 |
| 5,835,243 | 11/1998 | Mori ...................................... | 358/518 |

FOREIGN PATENT DOCUMENTS

| | | |
|---|---|---|
| 5-115000 | 5/1993 | Japan . |
| 6-121159 | 4/1994 | Japan . |
| 6-95723 | 4/1994 | Japan . |
| 6-189121 | 7/1994 | Japan . |
| 6-253138 | 9/1994 | Japan . |
| 6253139 | 9/1994 | Japan . |
| 7-87347 | 3/1995 | Japan . |
| 7-298073 | 11/1995 | Japan . |

OTHER PUBLICATIONS

"Display and Imaging" SCI, vol. 2, No. 1, 1993, pp. 17–25.
"Nonlinear Optimization" by J. Kowalik et al., translated into Japanese by Yamamoto et al., Baifu–kan.

*Primary Examiner*—Phuoc Tran
*Attorney, Agent, or Firm*—Oliff & Berridge, PLC

[57]   ABSTRACT

An image processing apparatus for converting input color image signals to image recording signals to be sent to an image forming apparatus. The image processing apparatus comprises: a first color converting unit for converting the input color image signals to three-variable color signals independent of devices; a second color converting unit for converting the three-variable color signals to the image recording signals; and a parameter determining unit for determining parameters of the first color converting unit. The parameter determining unit determines the parameters so as to make characteristic colors in the input color image signals coincide with predetermined colors and to maintain linearities of color reproduction characteristics of an output image from the image forming apparatus.

33 Claims, 18 Drawing Sheets

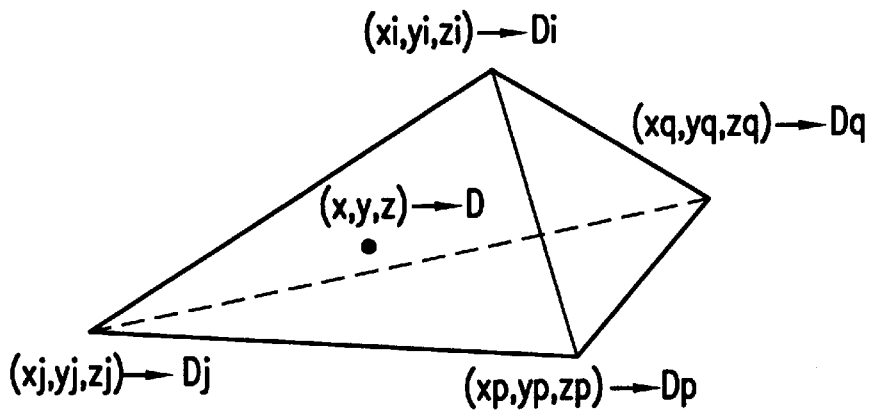

$$D = D_i \Phi_i(x,y,z) + D_j \Phi_j(x,y,z) \\ + D_p \Phi_p(x,y,z) + D_q \Phi_q(x,y,z) \quad \cdots (1)$$

FIG.5A $$\Phi_i(x,y,z) = \begin{vmatrix} 1 & x & y & z \\ 1 & x_j & y_j & z_j \\ 1 & x_p & y_p & z_p \\ 1 & x_q & y_q & z_q \end{vmatrix} \Bigg/ \begin{vmatrix} 1 & x_i & y_i & z_i \\ 1 & x_j & y_j & z_j \\ 1 & x_p & y_p & z_p \\ 1 & x_q & y_q & z_q \end{vmatrix} \quad \cdots (2)$$

$$\Phi_j(x,y,z) = \begin{vmatrix} 1 & x_i & y_i & z_i \\ 1 & x & y & z \\ 1 & x_p & y_p & z_p \\ 1 & x_q & y_q & z_q \end{vmatrix} \Bigg/ \begin{vmatrix} 1 & x_i & y_i & z_i \\ 1 & x_j & y_j & z_j \\ 1 & x_p & y_p & z_p \\ 1 & x_q & y_q & z_q \end{vmatrix} \quad \cdots (3)$$

$$\Phi_p(x,y,z) = \begin{vmatrix} 1 & x_i & y_i & z_i \\ 1 & x_j & y_j & z_j \\ 1 & x & y & z \\ 1 & x_q & y_q & z_q \end{vmatrix} \Bigg/ \begin{vmatrix} 1 & x_i & y_i & z_i \\ 1 & x_j & y_j & z_j \\ 1 & x_p & y_p & z_p \\ 1 & x_q & y_q & z_q \end{vmatrix} \quad \cdots (4)$$

$$\Phi_q(x,y,z) = \begin{vmatrix} 1 & x_i & y_i & z_i \\ 1 & x_j & y_j & z_j \\ 1 & x_p & y_p & z_p \\ 1 & x & y & z \end{vmatrix} \Bigg/ \begin{vmatrix} 1 & x_i & y_i & z_i \\ 1 & x_j & y_j & z_j \\ 1 & x_p & y_p & z_p \\ 1 & x_q & y_q & z_q \end{vmatrix} \quad \cdots (5)$$

FIG.5B

IMAGE PROCESSING APPARATUS

BACKGROUND OF THE INVENTION

1. Field of the Invention

The present invention relates to an image processing apparatus for converting input color image signals to image recording signals that are sent to an image forming apparatus such as a color printer, the input color image signals including image data that is obtained through scanning of a photographic film or acquired from a digital still camera.

2. Description of the Related Art

Recent years have seen advances in computer technology, improvements in communication networks and the introduction of mass storage media, accompanied by widespread use of scanners and digital still cameras. The trend has given impetus to a growing need for processing photographic image data, i.e., the need for photo image data to be printed out with high quality.

In the area of photographic films, images are output less often in analog fashion today. Instead, image processing and editing are carried out increasingly on digitized images to comply with a need for enhanced-quality, multi-functional image print-out.

The photographic image data to be printed out typically comprises so-called memory colors of characteristic image portions such as the color of the human skin, the blue of the skies and the green of the greenery. A need has been recognized to reproduce such characteristic portions in visually preferred or desired colors.

The need for such memory color reproduction is addressed illustratively by Japanese Published Unexamined Patent Application No. Hei 6-121159. The publication discloses a method for extracting memory colors from an image and converting the extracted portions into visually desirable colors that were previously determined by sensor evaluation. The extracted portions with their colors thus determined are then printed out.

Image forming apparatuses such as printers and image display units have different ranges of color reproduction from one device to another. In particular, printers differ significantly from display units in terms of color reproduction ranges. This can lead to cases where input image data acquired from an image input source such as a scanner is not necessarily printed exactly as displayed, part of the input image data being left out upon print-out.

FIG. 17 is a graphic representation showing differences in color reproduction ranges between devices. In FIG. 17, a region op indicates a typical color reproduction range of a color printer (Kodak XL7700), and a region Gm stands for a representative color reproduction range of an ordinary ROB color video monitor. The figure sketches the color reproduction ranges on an a*b* plane at L*=50.0 in a CIE·L*a*b* color space.

In FIG. 17, the image data at point Pi cannot be printed out as such because it is outside the color reproduction range Gp of the printer. To have the image data at point Pi output by the printer requires additional procedures of operation or data conversion.

Several such procedures have been proposed so far. For example, Japanese Published Unexamined Patent Application No. Hei 7-298073 discloses ways to "clip" image data outside a given color reproduction range in a chroma direction such that the data will be located on a boundary of the target range. More specifically, the image data at point Pi in FIG. 17 is converted to image data at point Po1 where a line connecting point Pi with the origin of the a*b* coordinates intersects the boundary of the color reproduction range Gp, the data conversion being performed in such a manner that the lightness and hue of the data at point Po1 match those of the data at point Pi.

Japanese Published Unexamined Patent Application No. Hei 5-115000 discloses another technique. The disclosure involves establishing a region in which to reproduce desired data inside the color reproduction range of the printer without chroma contraction; image data outside the range is partially contracted in chroma.

Japanese Published Unexamined Patent Application Nos. Hei 6-253138 and Hei 6-253139 disclose a method whereby specific points in color space are explicitly mapped, the remaining portions being mapped by interpolation or like manner. According to this method, the image data at point Pi in FIG. 17 is converted to image data at point Po2 on a boundary of the color reproduction range Gp.

Japanese Published Unexamined Patent Application No. Hei 6-189121 discloses another method. The disclosed method utilizes evaluation functions supplemented with deviations weighted in terms of lightness, chroma and hue between monitor-displayed coloration and print colors in response to input signals. These functions are used to optimize color converting parameters, whereby the target color reproduction range is contracted for preferred sensory perception.

The method disclosed by the above-cited Japanese Published Unexamined Patent Application No. Hei 6-121159 appears to be effective in reproducing memory colors in visually preferable coloration upon print-out of photographic image data.

However, the disclosed method has a disadvantage stemming from a color correcting process performed on the extracted memory color regions, the process being different from the one on the remaining regions. The dissimilar process can produce a discontinuity between the memory colors and the remaining colors as shown in FIG. 18A, generating a false contour or other flaws in color reproduction.

Japanese Published Unexamined Patent Application No. Hei 7-298073 cited above resorts to the clipping of image data in addressing a narrower color reproduction range of the printer than that of the display unit. However, the method of clipping image data outside the color reproduction range in the direction of chroma to relocate the data onto a boundary of the range can lead to a chroma fusion in highly saturated portions, as indicated by a linear segment 3 in FIG. 18B. The result can be a significantly degraded quality of output images.

The technique disclosed in the above-cited Japanese Published Unexamined Patent Application No. Hei 5-115000 aims to establish a region in which to reproduce image data inside the color reproduction range of the printer without chroma contraction, while image data outside the range is partially contracted in chroma. This method, while not as conspicuously as the above-mentioned clipping method, can still cause a chroma fusion in highly saturated portions as shown by a linear segment 4 in FIG. 18B, resulting in a degraded quality of output images.

The method disclosed in Japanese Published Unexamined Patent Application Nos. Hei 6-253138 and Hei 6-253139 eases any chroma fusion in highly saturated portions. Still, this method has a disadvantage, as evident from a curved segment 9 in FIG. 18C, of causing a warped hue and of disturbing linearity of the chroma gradation characteristic.

In addition, the method has difficulty in guaranteeing the continuity of colors in cases where there are many points to be matched in color.

The technique of the above-cited Japanese Published Unexamined Patent Application No. Hei 6-189121 has a disadvantage similar to that of the clipping method regarding output chroma characteristics as opposed to input chroma. That is, the technique also tends to cause a chroma fusion in highly saturated portions, although not as severely as the clipping method, as indicated by a broken line curve 5 in FIG. 18B. The disclosed technique has another disadvantage of requiring a great deal of effort in determining the necessary evaluation functions. Specifically, color converting parameters need to be determined by establishing a large number of points as evaluation points in color space. For each evaluation point, a weighting factor needs to be determined through sensor evaluation.

As the digital photo system is coming into general use, there will be a growing number of cases in which users bring their photo films or CD-ROMs into local print shops and later receive prints there derived from the submitted materials. In such cases, there will conceivably be more users wishing to get better color reproduction in their prints than those who prefer having their prints coincide with monitor-displayed colors.

Aged deterioration of photo films or their inadequate exposure, as well as diverse image input devices to be dealt with, can contribute to color balance variations from one print image to another. It follows that faithfully printing out input data according to its color balance can lead to undesirable color reproduction of prints if the color balance of the input data has been subsequently changed.

As outlined above, there have yet to be developed color image processing techniques for converting digital photo data into colors exactly as desired by users. The method for contracting the color reproduction range, extensively used so far, rests on the precondition that print colors coincide visually with monitor-displayed colors. The requirement involves having the color reproduction range contracted in the chroma direction while keeping the level of overall saturation as high as possible. This means theoretically that highly saturated portions tend to produce a fusion of chroma gradation.

It may happen that a color imbalance on the monitor results in flawed color reproduction thereby. This will make it impossible to acquire the user's preferred colors even if the print colors match the monitor-displayed colors.

The hitherto-proposed technique of extracting memory colors of the humans and subjecting the extracted colors to a different color correcting process apparently improves reproduction of the memory colors. But the technique is deficient in overcoming the discontinuity between the memory colors and other colors or in eliminating the generation of a false contour.

The point is not that print colors should match some extraneous criteria but that the colors are to be reproduced as preferred by users. This simply requires making colors attracting users' attention such as memory colors coincide with what the users keep in their memory.

It happens frequently that the need for reproducing memory colors and the need for preventing chroma fusion in highly saturated portions are mutually exclusive. A trade-off needs to be made between these two requirements when color converting characteristics are determined.

There is room for variations in the colors that are kept in the human memory. This means that, unlike under conventional schemes, memory colors need not necessarily match predetermined values. What is more important is for hue and chroma settings to be brought to better levels than before.

In order to implement gradation without chroma fusion in highly saturated portions, it is imperative to utilize the widest possible range of color reproduction on the part of the image forming apparatus. To make memory colors coincide with what users keep in their memory requires that a memory color range be extracted from input image data with the characteristics of the input data taken into consideration.

SUMMARY OF THE INVENTION

It is therefore an object of the present invention to provide an image processing apparatus which reproduces any input image in prints always having visually preferred colors; which permits satisfactory reproduction of lightness, chroma and hue of images portions such as memory colors attracting attention of the humans; and which offers good color reproduction characteristics guaranteeing the gradation and hue linearity of the whole image with no chroma fusion in highly saturated portions.

It is another object of the present invention to provide an image processing apparatus offering good color reproduction characteristics using a small number of parameters, whereby the parameters involved are optimized in a reliable manner.

It is a further object of the invention to provide an image processing apparatus which utilizes a limited number of evaluation points to reproduce simply and reliably memory colors or the like exactly as desired by the user.

In carrying out the invention and according to one aspect thereof, there is provided an image processing apparatus for converting input color image signals to image recording signals to be sent to an image forming apparatus, the image processing apparatus comprising: first color converting means for converting the input color image signals to three-variable color signals independent of devices; second color converting means for converting the three-variable color signals to the image recording signals; and parameter determining means for determining parameters of the first color converting means; wherein the parameter determining means determines the parameters so as to make characteristic colors in the input color image signals coincide with predetermined colors and to maintain linearity of color reproduction characteristics of an output image from the image forming apparatus.

In the inventive image processing apparatus of the above constitution, the input color image signals are converted by the first color converting means into the three-variable color signals that are not dependent on any specific devices. The three-variable color signals are converted by the second color converting means into the image recording signals.

The first color converting means converts the input color image signals to the three-variable color signals using the color converting parameters determined by the parameter determining means. The parameter determining means determines the color converting parameters of the first color converting means for two purposes: to make the characteristic colors such as memory colors in the input color image signals coincide with predetermined colors; and to maintain the linearity of the color reproduction characteristics of the output image from the image forming apparatus.

The color converting parameters thus determined to address the above two purposes are used by the first color converting means to convert the input color image signals into the three-variable color signals. The setup above permits adequate reproduction of lightness, chroma and hue in the characteristic color portions of the image, guarantees gradation characteristics and hue linearity of the whole image, and suppresses nonlinear image quality degradation such as chroma fusion in highly saturated portions.

These and other objects, features and advantages of the invention will become more apparent upon a reading of the following description and appended drawings.

BRIEF DESCRIPTION OF THE DRAWINGS

FIGS. 5A and 5B are views showing how tetrahedron interpolation is performed by the three-dimensional interpolation color converting circuit in the image processing apparatus of FIG. 3;

DESCRIPTION OF THE PREFERRED EMBODIMENTS

Preferred embodiments of the present invention will now be described with reference to the accompanying drawings.

(Color Image Output System Embodying the Invention)

Figure 1:
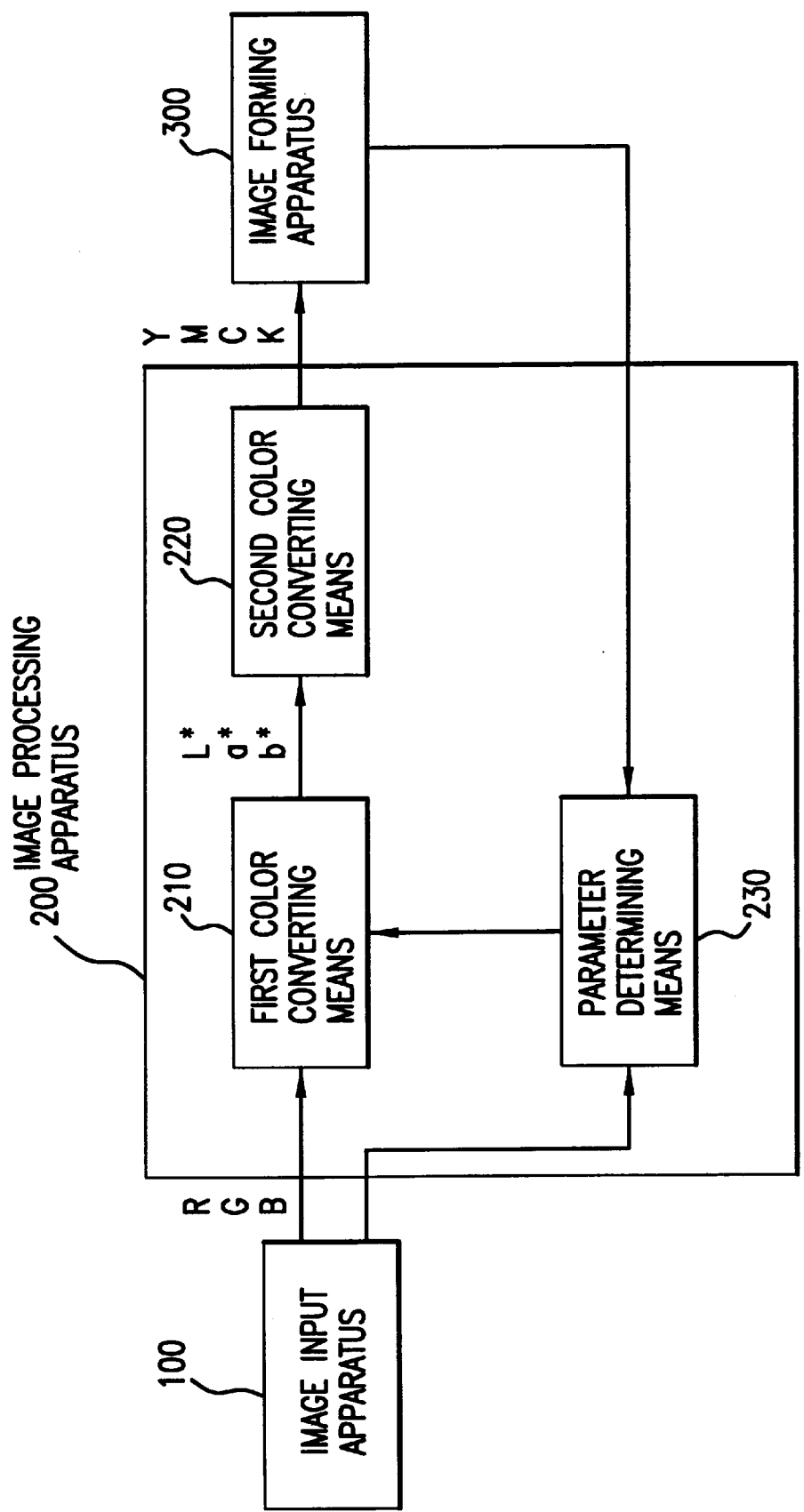
FIG. 1 is a block diagram of a typical color image output system using an image processing apparatus of the invention.

FIG. 1 is a block diagram of a typical color image output system using an image processing apparatus of the invention. The color image output system as a whole is made up of an image input apparatus 100, an image processing apparatus 200 and an image forming apparatus 300.

The image input apparatus 100 receives color images in various formats from the outside. In turn, the image input apparatus 100 of this example outputs color image signals constituted by 24-bit RGB data made of red (R), green (G) and blue (B), each color being composed of eight bits and furnished in 256 grades.

Specifically, the image input apparatus 100 supplies the image processing apparatus 200 with RGB data acquired in one of several processes. That is, the apparatus 100 may use a CCD sensor to read RGB data from 35-mm color negative or positive films or APS films representative of the silver salt photographic film; the apparatus 100 may read image data from CD-ROMs in the KODAK Photo CD format and convert the read data into RGB data; the apparatus 100 may receive picture data from a digital still camera such as the Canon DCS1c and convert the received data into RGB data; the apparatus 100 may read color image data edited by the user operating a computer and stored in a storage medium such as MO (magneto-optical disk) or ZIP disk and may convert the read data into RGE data; or the apparatus 100 may convert to RGB data the image data sent from a device on a network.

The image processing apparatus 200 as a whole is made up of first color converting means 210, second color converting means 220 and parameter determining means 230. The RGB data received from the image input apparatus 100 is converted by the first color converting means 210 into data in a CIE·L*a*b* color space, which Is one of uniform color spaces.

The color converting characteristic of the first color converting means 210 is defined by color converting parameters. The parameters are determined by the parameter determining means 230 based on the input RGB data and on the color reproduction characteristic such as the color reproduction range of the image forming apparatus 300, the color reproduction characteristic being transferred from the image forming apparatus 300. The color converting parameters thus determined are sent to the first color converting means 210.

The L*a*b* data from the first color converting means 210 is converted by the second color converting means 220 into image recording signals for the color space of the image forming apparatus 300. In this example, the image recording signals comprise four-color data, i.e., Y (yellow), M (magenta), C (cyan) and K (black). The image recording signals thus prepared are transferred to the image forming apparatus 300. Using the YMCK data, the image forming apparatus 300 draws an image on a suitable sheet of paper.

The most common input color signals from the image input apparatus 100 are RGB data. The examples that follow will use RGB data. However, other types of data may also be used such as YMC color space data or YCC color space data for use on Photo CDs.

The first color converting means 210 is typically one which converts the input color signals into L*a*b* color space data. The examples that follow will utilize the type of means 210 for converting the input color signals to L*a*b* color space data. However, the first color converting means 210 may alternatively be one which converts the input color signals into other color space data such as XYZ color space data or Luv color space data as long as the color space in question is not dependent on any specific devices. It is preferable that the first color converting means 210 be one which converts the input color signals into uniform color space data.

In the examples that follow, the color space for the image forming apparatus 300 will refer to the YMCK color space. However, this is not limitative of the invention and other color spaces such as the YMC color space or RGB color space may alternatively be used by the image forming apparatus 300. The image drawing medium for use with the image forming apparatus 300 is not limited to sheets of paper as will be the case in the description that follows. Other suitable media may also be used instead.

Figure 2:
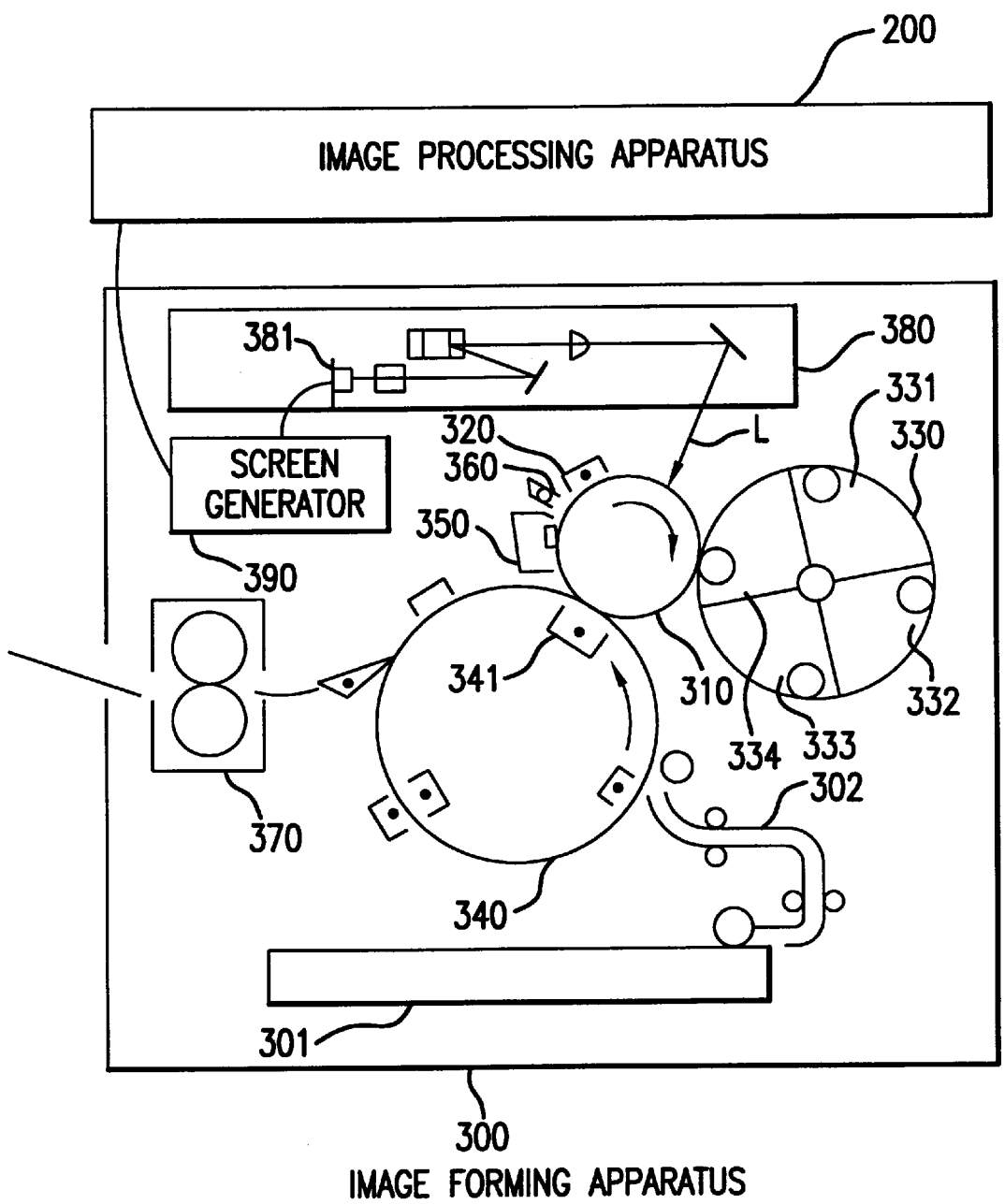
FIG. 2 is a schematic view of a typical image forming apparatus in the system of FIG. 1.

FIG. 2 is a schematic view of a typical image forming apparatus 300. The apparatus of this example is a single engine type electrophotographic color printer. Four-color (YMCK) data from the image processing apparatus 200 is converted for each color by a screen generator 390 into a binary signal with its pulse width modulated in accordance with the data value. The binary signals constitute what is called a screen signal.

The screen signal drives a laser diode 381 when introduced into a laser beam scanner 380. The laser beam scanner 380 has the laser diode 381 output a laser beam L that is emitted onto a photosensitive drum 310.

The photosensitive drum 310 is electrically charged by a charging device 320 for electrostatic latent image formation. The laser beam L emitted by the laser beam scanner 380 forms electrostatic latent images over the surface of the drum 310.

The photosensitive drum 310 with electrostatic latent images formed thereon comes into contact with image developing units 331, 332, 333 and 334, respectively for the four colors (KYMC), in a rotary developing device 330. The contact operation causes the electrostatic latent images in the respective colors on the photosensitive drum 310 to be developed into toner images.

A sheet of paper in a paper tray 301 is collected by a sheet feeder 302, fed to a transfer drum 340 and wrapped around the latter. At the same time, a transfer charging device 341 applies corona discharge from behind the sheet. This causes the developed toner images on the photosensitive drum 310 to be transferred onto the sheet of paper. Where a multi-color image is to be obtained, the sheet is brought into contact with the photosensitive drum 310 two to four times in a row. The repeated contact of the sheet with the drum 310 causes the multiple images in up to four colors (KYMC) to be all transferred to the sheet of paper.

After image transfer, the sheet is sent to a fusing device 370 whereby the toner images are heated and fused onto the sheet. With the toner images transferred to the sheet, the photosensitive drum 310 is cleaned by a cleaner 350. After cleaning, the photosensitive drum 310 is prepared by a preliminary exposing device 360 for another use.

Although the example in FIG. 2 is a single engine type, this is not limitative of the invention. The image forming apparatus 300 may also be any one of other electrophotographic printers including the tandem engine type and the image-on-image type whereby color images formed on a photosensitive drum are transferred collectively onto a suitable medium.

As will be described later, this invention also applies to other types of image forming apparatus than the electrophotography type, such as the silver salt photography type, thermal transfer type and ink jet type. Such alternative applications still yield the same effects.

(First Embodiment in the Form of an Image Processing Apparatus)

Figure 3:
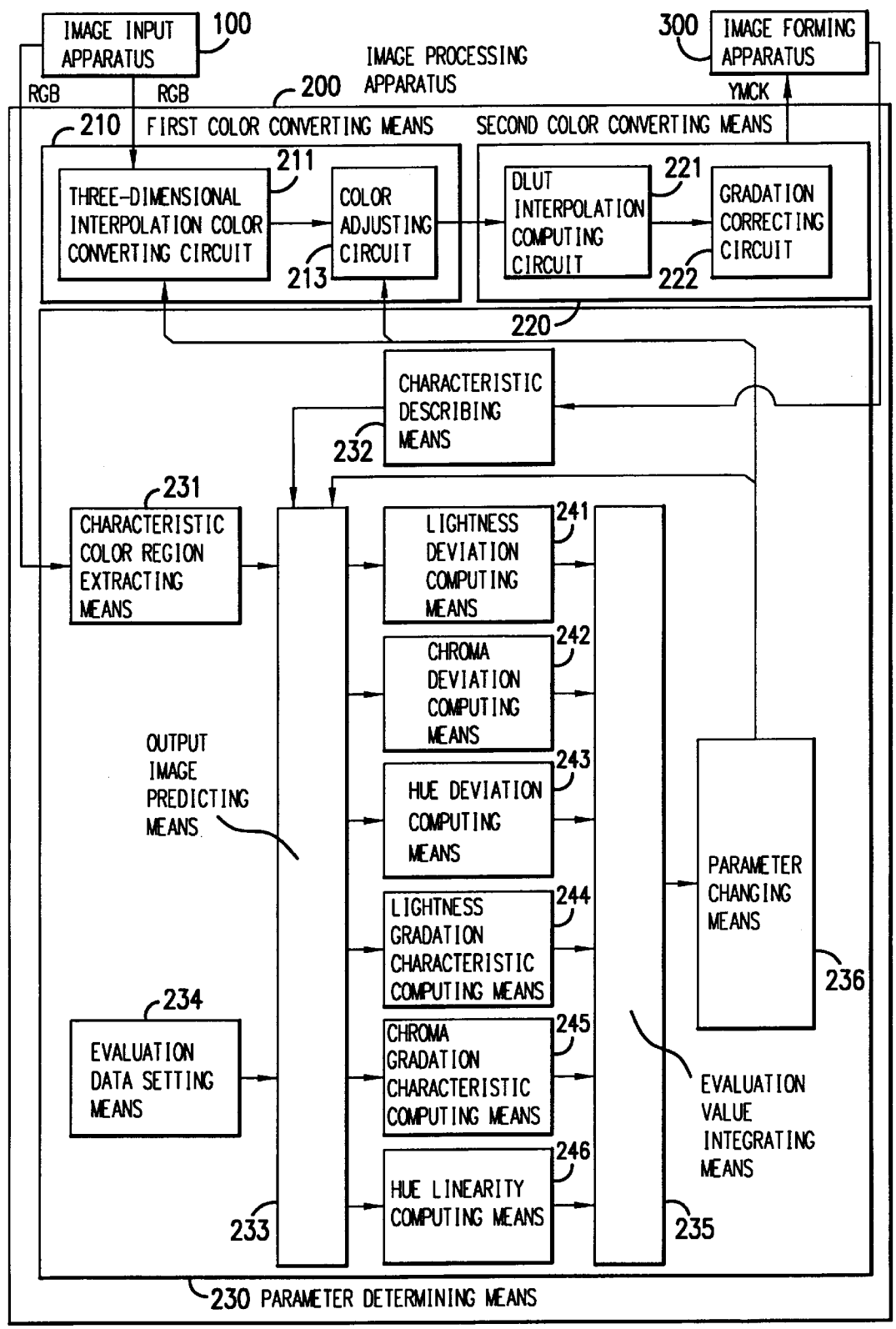
FIG. 3 is a block diagram of an image processing apparatus practiced as a first embodiment of the invention.

FIG. 3 is a block diagram of a typical image processing apparatus 200 shown in FIG. 1. The apparatus of this example comprises the first and second color converting means 210 and 220. The first color converting means 210 has a specialized three-dimensional interpolation color converting circuit 211 and a color adjusting circuit 213, to be described later. The second color converting means 220 includes a DLUT interpolation computing circuit 221 of a known type and a gradation correcting circuit 222, to be described later.

The parameter determining means 230 in this embodiment comprises characteristic color region extracting means 231, characteristic describing means 232, output image predicting means 233, evaluation data setting means 234, lightness deviation computing means 241, chroma deviation computing means 242, hue deviation computing means 243, lightness gradation characteristic computing means 244, chroma gradation characteristic computing means 245, hue linearity computing means 246, evaluation value integrating means 235, and parameter changing means 236.

Input RGB data from the image input apparatus 100 is fed to the characteristic color region extracting means 231. In turn, the characteristic color region extracting means 231 extracts from the input RCB data the characteristic color regions attracting the user's attention most in the input image. These characteristic color regions are typically constituted by memory colors such as the skin color i.e., colors of the human being, the green of greenery and the blue of the skies. The RGB data representing the extracted characteristic color regions is sent to the output image predicting means 233.

As will be described later, the characteristic describing means 232 communicates with the image forming apparatus 300 and receives data therefrom, the received data indicating the color reproduction range of the image forming apparatus 300. The data from the characteristic describing means 232 is sent to the output image predicting means 233, which is also supplied with the RGB data on the characteristic color regions from the characteristic color region extracting means 231. Using the received data, the output image predicting means 233 predicts as L*a*b* color data the output colors following color conversion by the first color converting means 210 that has the three-dimensional interpolation color converting circuit 211 and color adjusting circuit 213. The predicted L*a*b* color data is transferred from the output image predicting means 233 to the lightness deviation computing means 241, chroma deviation computing means 242 and hue deviation computing means 243.

The lightness deviation computing means 241 computes deviations in lightness between the predicted data about the characteristic colors on the one hand and lightness settings defined beforehand by use of L*a*b* data on the other hand. The computed result is transferred to the evaluation value integrating means 235. The chroma deviation computing means 242 computes deviations in chroma between the predicted data about the characteristic colors on the one hand and predetermined chroma settings on the other hand. The computed result is likewise transferred to the evaluation value integrating means 235. The hue deviation computing means 243 computes deviations in hue between the predicted data about the characteristic colors on the one hand and predetermined hue settings on the other hand. The computed result is also transferred to the evaluation value integrating means 235.

Meanwhile, the evaluation data setting means 234 sets up evaluation data in advance using RGB data. The predetermined evaluation data comprises illustratively gradation data about the colors that are likely to attract users' attention for a particular gradation, for a fused gradation in highly saturated portions or for a nonlinear hue. The color gradation data thus established is sent to the output image predicting means 233.

The output image predicting means 233 receives from the characteristic describing means 232 the data written therein to designate the color reproduction range of the image forming apparatus 300. The evaluation data setting means 234 feeds the output image predicting means 233 with RGB data as evaluation data. On the basis of both the color reproduction range data and the evaluation data, the output image predicting means 233 predicts as L*a*b* color data the output colors following color conversion by the first color converting means 210 made of the three-dimensional interpolation color converting circuit 211 and color adjusting circuit 213. The L*a*b* data is transferred as the predicted data to the lightness gradation characteristic computing means 244, chroma gradation characteristic computing means 245 and hue linearity computing means 246.

The lightness gradation characteristic computing means 244 computes the linearity of lightness gradation in the predicted data reflecting the evaluation data. The computed result is sent to the evaluation value integrating means 235. The chroma gradation characteristic computing means 245 computes the linearity of chroma gradation in the predicted data reflecting the evaluation data. The computed result is also transferred to the evaluation value integrating means 235. The hue linearity computing means 246 computes hue linearity in the predicted data reflecting the evaluation data. The computed result is likewise sent to the evaluation value integrating means 235.

The evaluation value integrating means 235 is thus supplied with image quality evaluation values from the lightness deviation computing means 241, chroma deviation computing means 242, hue deviation computing means 243, lightness gradation characteristic computing means 244, chroma gradation characteristic computing means 245 and hue linearity computing means 246. The respective image quality evaluation values are weighted, added up and integrated, whereby an overall image quality evaluation value is obtained. The acquired overall evaluation value is sent to the parameter changing means 236.

The parameter changing means 236 changes parameters of the three-dimensional interpolation color converting circuit 211 and color adjusting circuit 213 if the overall evaluation value from the evaluation value integrating means 235 fails to meet predetermined converging conditions. The changed parameters are transferred to the output image predicting means 233 so that the predicting means 233 and other related components will repeat the image quality evaluation process until the overall evaluation value meets the converging conditions. When the converging conditions are met by the overall evaluation value, the parameters in effect at that point are regarded as optimized parameters which are then transferred to the three-dimensional interpolation color converting circuit 211 and color adjusting circuit 213.

After the optimized parameters have been determined, the image input apparatus 100 supplies input RGB data to the three-dimensional interpolation color converting circuit 211 in the first color converting means 210. In turn, the three-dimensional interpolation color converting circuit 211 converts the input RGB data into L*a*b* data, as will be described later. The L*a*b* data after conversion is color-adjusted by the color adjusting circuit 213 in the L*a*b* color space, i.e., a uniform color space, as will also be described later. After color adjustment, the L*a*b* data is output from the color adjusting circuit 213 in the first color converting means 210.

The color-adjusted L*a*b* data is then converted to YMCK data reflecting the L*a*b* data. The conversion process is carried out by that DLUT interpolation computing circuit 221 in the second color converting means 220 which is a known circuit to be described later and which comprises DLUTs (direct look-up tables) and an interpolation computing circuit. The YMCK data after conversion is corrected in gradation by the gradation correcting circuit 222. After gradation correction, the YMCK data is output as image recording signals from the gradation correcting circuit 222 in the second color converting means 220.

The image recording signals composed of the gradation-corrected YMCK data are transferred to the image forming apparatus 300. In turn, the image forming apparatus 300 draws images on a sheet of paper in the manner described earlier with reference to FIG. 2.

As described, the input RGB data is fed to the character color region extracting means 231 in the parameter determining means 230. With the optimized parameters determined, the input RGB data is supplied to the three-dimensional interpolation color converting means 211 in the first color converting means 210. Thus the image input apparatus 100 includes illustratively an image buffer memory through which the input RGB data is read out repeatedly. Alternatively, the silver salt photographic film mentioned above may be read out repeatedly in order to output the input RGB data as many times as needed.

The DLUT interpolation computing circuit 221 comprises DLUTs and an interpolation computing circuit as described above. Of the L*a*b* data from the first color converting means 210 (eight bits long per point), the high-order four bits are used to generate the address of a lattice point near each point determined by the L*a*b* data. The addresses of such nearby lattice points are used as the basis for reading nearby lattice point data from the DLUTs. The data on each lattice point thus read out is interpolated by use of the low-order four bits of the L*a*b* data, whereby output YMCK data is obtained.

Illustratively, a publication "Display and Imaging" (SCI, Volume 2, Number 1, 1993, pp. 17–25) describes ways to perform cubic interpolation with reference to eight nearby lattice points, prism interpolation with reference to six nearby lattice points, and tetrahedron interpolation with reference to four nearby lattice points. The first embodiment may utilize some of these methods, prism interpolation for instance. In such a case, the address of any nearby lattice point need not be limited to the high-order four bits of L*a*b* data.

The gradation correcting circuit 222 is intended to correct nonlinear gradation characteristics of the image forming apparatus 300. The circuit 222 is composed of as many eight-bit LUTs (look-up tables) as the component colors making up the YMCK data. Alternatively, the contents of the LUTs constituting the gradation correcting circuit 222 may be updated periodically to correct secular changes of the image forming apparatus 300.

The first embodiment uses the DLUT interpolation computing circuit 221 in the second color converting means 220 in order to convert L*a*b* data to YMCK data with high precision. Alternatively, the second color converting means 220 may be replaced by other types of color converting circuit such as a matrix type color converting circuit and a neural network type color converting circuit used extensively as color converting means.

A feature characteristic of the first embodiment is a color converting process carried out by the three-dimensional interpolation color converting circuit 211 in the first color converting means 210. This color converting process will now be described with reference to FIGS. 4A through 4C as well as 5A and 5B.

Figure 4A:
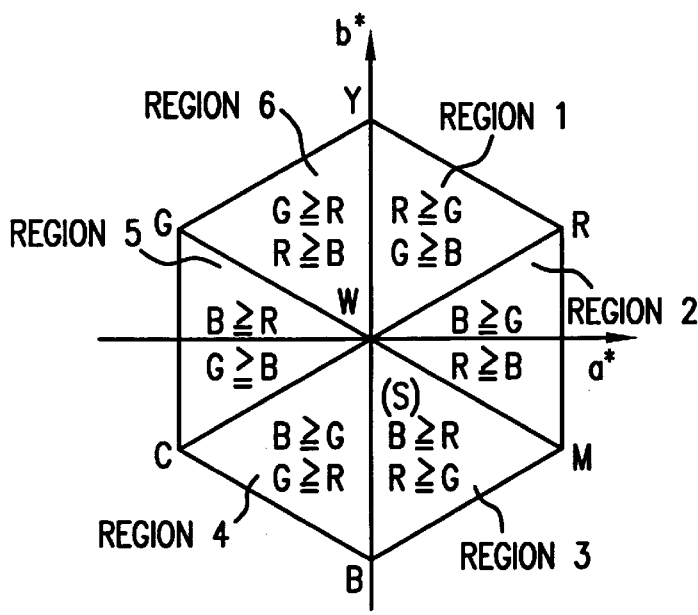
FIGS. 4A, 4B and 4C are views of interpolated regions for a three-dimensional interpolation color converting circuit in the image processing apparatus of FIG. 3.
Figure 4B:
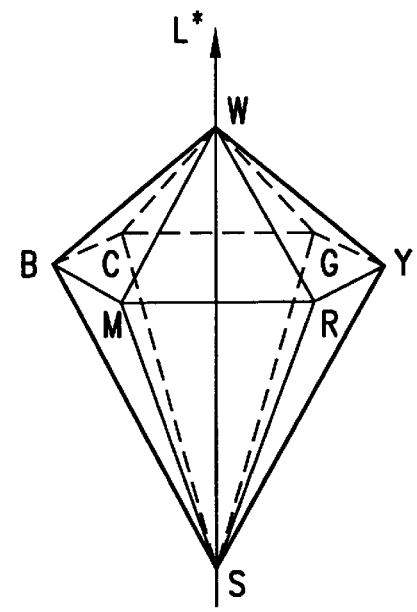

According to the color converting process of the three-dimensional interpolation color converting circuit 211, the color reproduction range of the image forming apparatus 300 in the L*a*b* color space is expressed by a dodecahedron having a total of eight vertexes in L*a*b* coordinates, as shown in FIGS. 4A and 4B. The vertexes are made up of maximum density points of red (R), green (G), blue (B), yellow (Y), magenta (M), cyan (C) and gray (S) as well as white (W) of the sheet of paper used by the image forming apparatus 300.

Figure 4C:
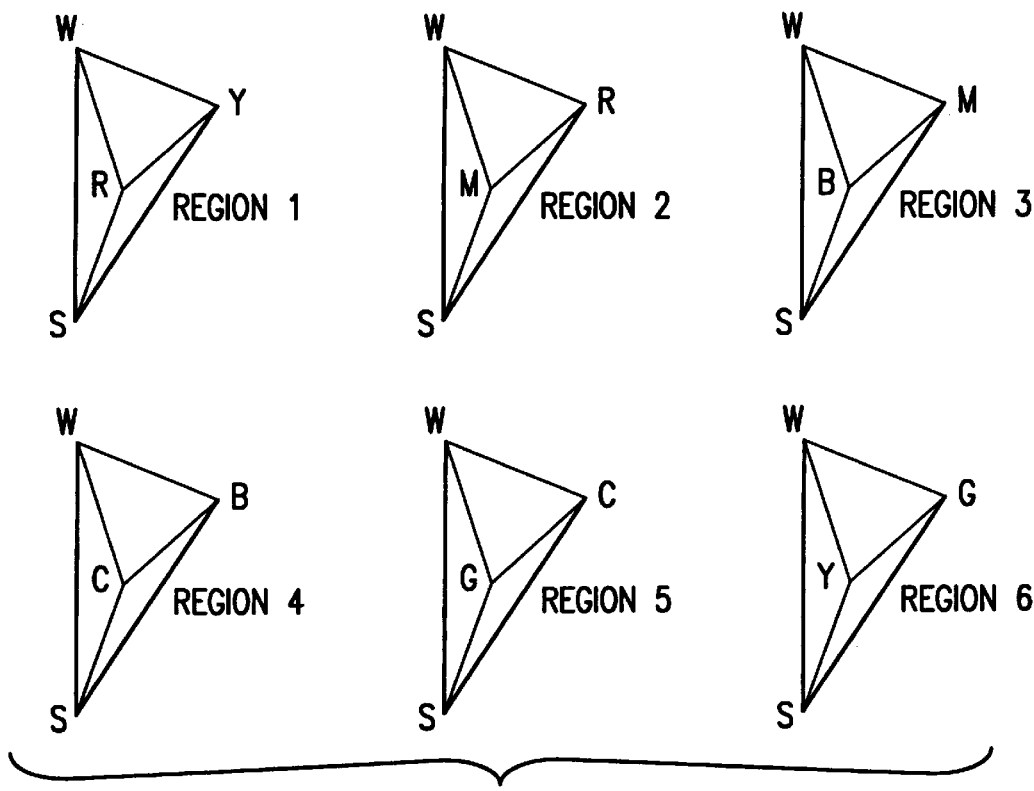

The dodecahedron is divided into six tetrahedrons each including a maximum gray density point S and a white point W representing the sheet of paper, as shown by regions 1 through 6 in FIG. 4C. Which tetrahedron contains the input RGB data is judged using inequalities shown in FIG. 4A. For example, the input RGB data in which R=100, B=128 and G=255 is judged to be the data contained in the tetrahedron of region 5 because B≧R and G≧B.

The input RGB data within a given tetrahedron is converted to the corresponding L*a*b* data by use of the interpolation process described below.

Suppose that, as shown in FIG. 5A, vertexes (xi, yi, zi), (xj, yj, zi), (xp, yp, zp) and (xq, yq, zq) of a tetrahedron are represented respectively by given data items Di, Dj, Dp and Dq constituting the L*a*b* data. In that case, an interpolation value D corresponding to a point (x, y, z) inside the tetrahedron is defined as $$D = Di \, \phi \, i(x, y, z) + Dj \, \phi \, j(x, y, z) + Dp \, \phi \, p(x, y, z) + Dq \, \phi \, q(x, y, z) \quad (1)$$

as shown in FIG. 5A.

Coordinates φ i(x, y, z), φ j(x, y, z), φ p(x, y, z) and φ q(x, y, z) are defined respectively by expressions (2), (3), (4) and (5) shown in FIG. 5B.

As described, the color reproduction range of the image forming apparatus 300 is described using a dodecahedron. The dodecahedron is divided into six tetrahedrons. Inside each of the tetrahedrons, linear interpolation computations are carried out to convert the input RGB data into L*a*b* data.

Compared with conventional color converting schemes such as the matrix type, neural network type and DLUT type employed extensively, the color converting method based on the above interpolation process offers the following major advantages:

First, the color reproduction range of the image forming apparatus 300 is maximized for use. As will be described later, the linearity of lightness direction and chroma direction is guaranteed, which in turn ensures the linearity of hue direction.

Second, the color converting parameters involved are as few as eight vertexes R, G, B, Y, M, C, S and W of a dodecahedron. Because the dodecahedron is divided into tetrahedrons reflecting the hues involved, it is easy to color-adjust and optimize each of the hues, as will be described later.

Third, the gray axis is represented by a side of each of the tetrahedrons making up the dodecahedron. This guarantees the continuity of the gray axis.

Furthermore, the inventive color converting process may utilize the hardware of the DLUT color converting means furnished for the conventional tetrahedron interpolation method. In such a case, the addresses to be stored in the DLUT arrangement involve the coordinates of only eight vertexes. This offers an implementation of the process at very low costs.

Figure 6:
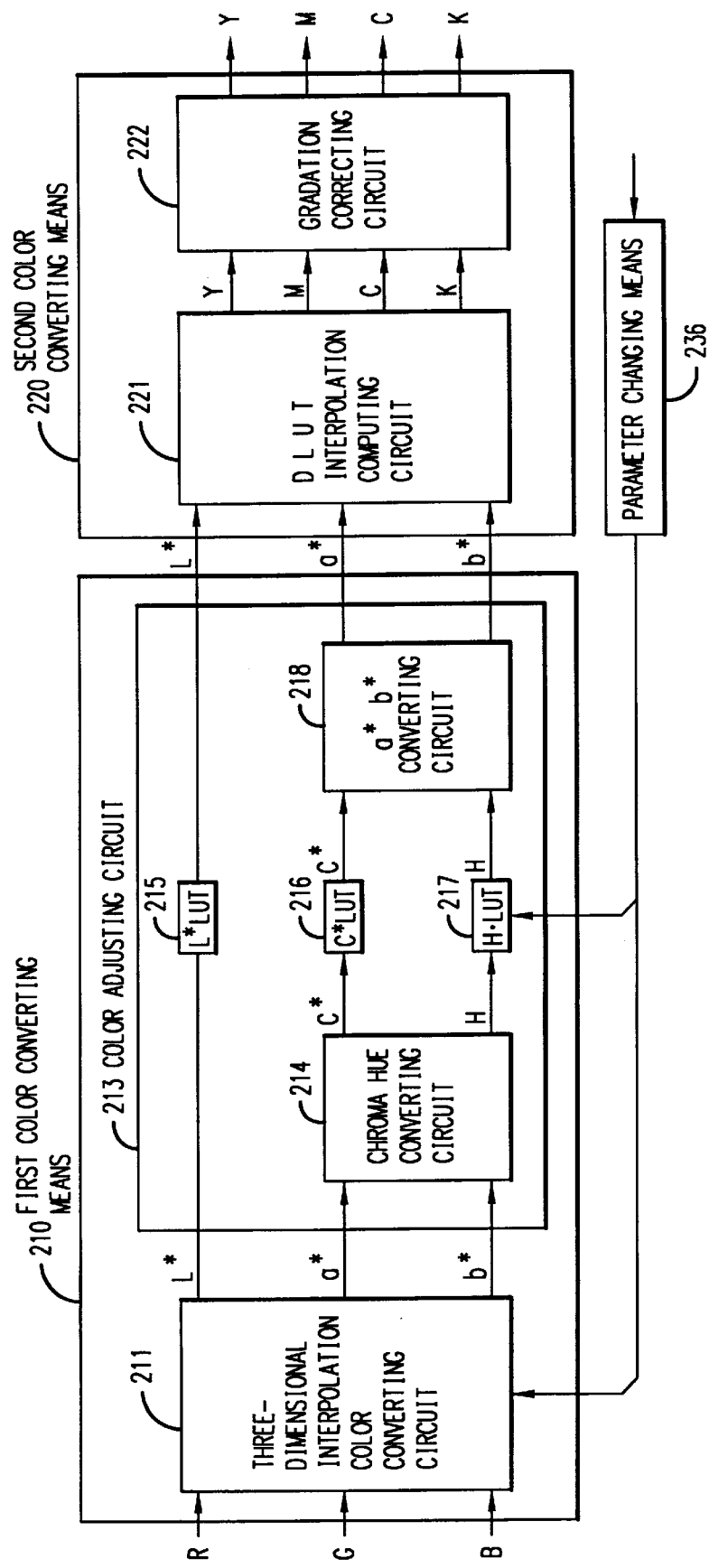
FIG. 6 is a block diagram of a typical color adjusting circuit in the image processing apparatus of FIG. 3.

FIG. 6 is a block diagram of a typical color adjusting circuit 213 in the first color converting means 210. In this example, of the L*a*b* data from the three-dimensional interpolation color converting circuit 211, the a*b* data is fed to the chroma hue converting circuit 214 for conversion into chroma data C* and hue data H, as defined by the expressions (6) and (7) below:

$$C^* = \{(a^*)^2 + (b^*)^2\}^{1/2} \quad (6)$$

$$H = \tan^{-1}(b^*/a^*) \quad (7)$$

The L* data from the three-dimensional interpolation color converting circuit 211 is input to an L*LUT 215. The chroma data C* from the chroma hue converting circuit 214 is input to a C*LUT 216. The hue data H is sent to an H·LUT 217.

The L*LUT 215, C*LUT 216 and H·LUT 217 are a one-dimensional look-up table each. The L*LUT 215, C*LUT 216 and H·LUT 217 provide adjustments in the direction of lightness, chroma and hue respectively.

Figure 7A:
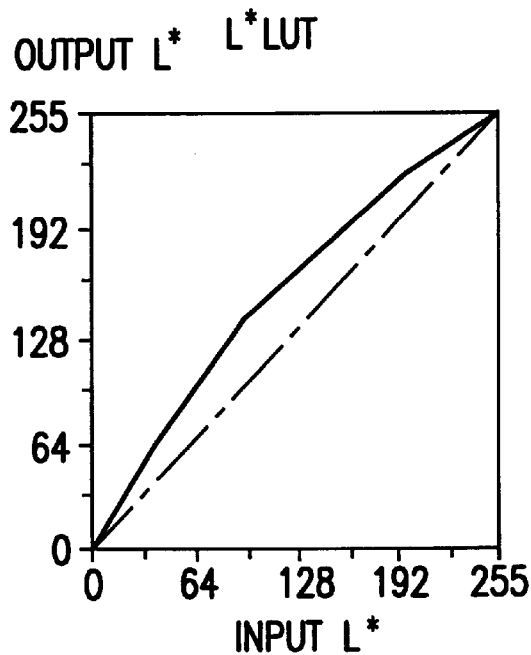
FIGS. 7A, 7B and 7C are graphic representations showing typical settings of look-up tables (LUTs) constituting the color adjusting circuit of FIG. 6.
Figure 7B:
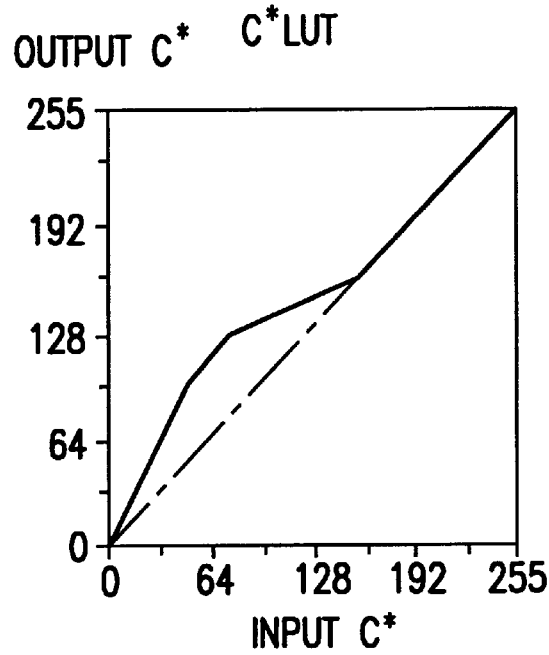
Figure 7C:
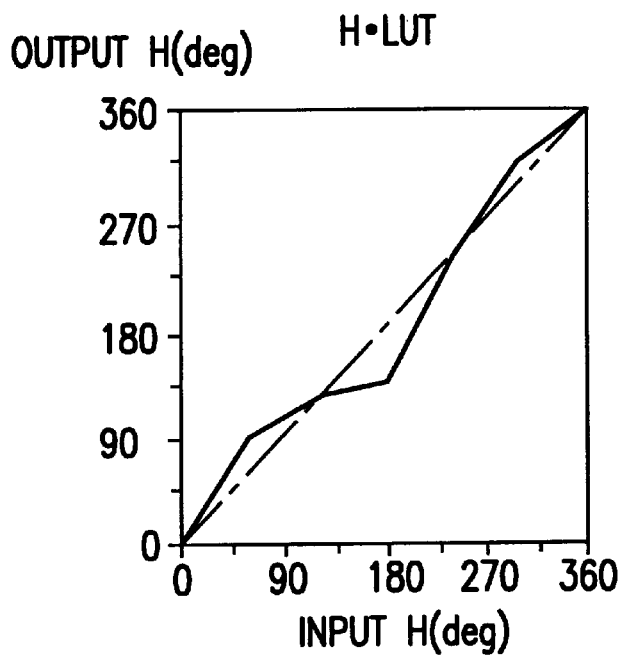

FIGS. 7A, 7B and 7C are graphic representations showing typical settings of the L*LUT 215, C*LUT 216 and H·LUT 217. In the L*LUT 215 and C*LUT 216, the maximum input data is standardized at 255.

The chroma data C* and hue data H following adjustment by the C*LUT 216 and H·LUT 217 are input to an a*b* converting circuit 218 for conversion into a*b* data, as defined by the expressions (8) and (9) below:

$$a^* = C^* \cos(H) \quad (8)$$

$$b^* = C^* \sin(H) \quad (9)$$

The a*b* data from the conversion above and the L* data after adjustment by the L*LUT 215 are supplied to the DLUT interpolation computing circuit 221 in the second color converting means 220.

The chroma hue converting circuit 214 and a*b* converting circuit 218 are not limited to executing definition expressions as described above. Alternatively, the circuits 214 and 218 may be constituted by a two-dimensional look-up table each.

When the L*a*b* data is adjusted by LUTs in the L*C*H color space as described above, the three-dimensional interpolation color converting circuit 211 may adjust linearly arranged data in the L*a*b* color space separately for lightness, chroma and hue. The adjustments may be made so as to attain the respective characteristics desired.

The color adjusting process above is not limitative of the invention. Alternatively, the L*a*b* data may be converted not to the L*C*H color space but to any other suitable color space for color adjustment.

Figure 8:
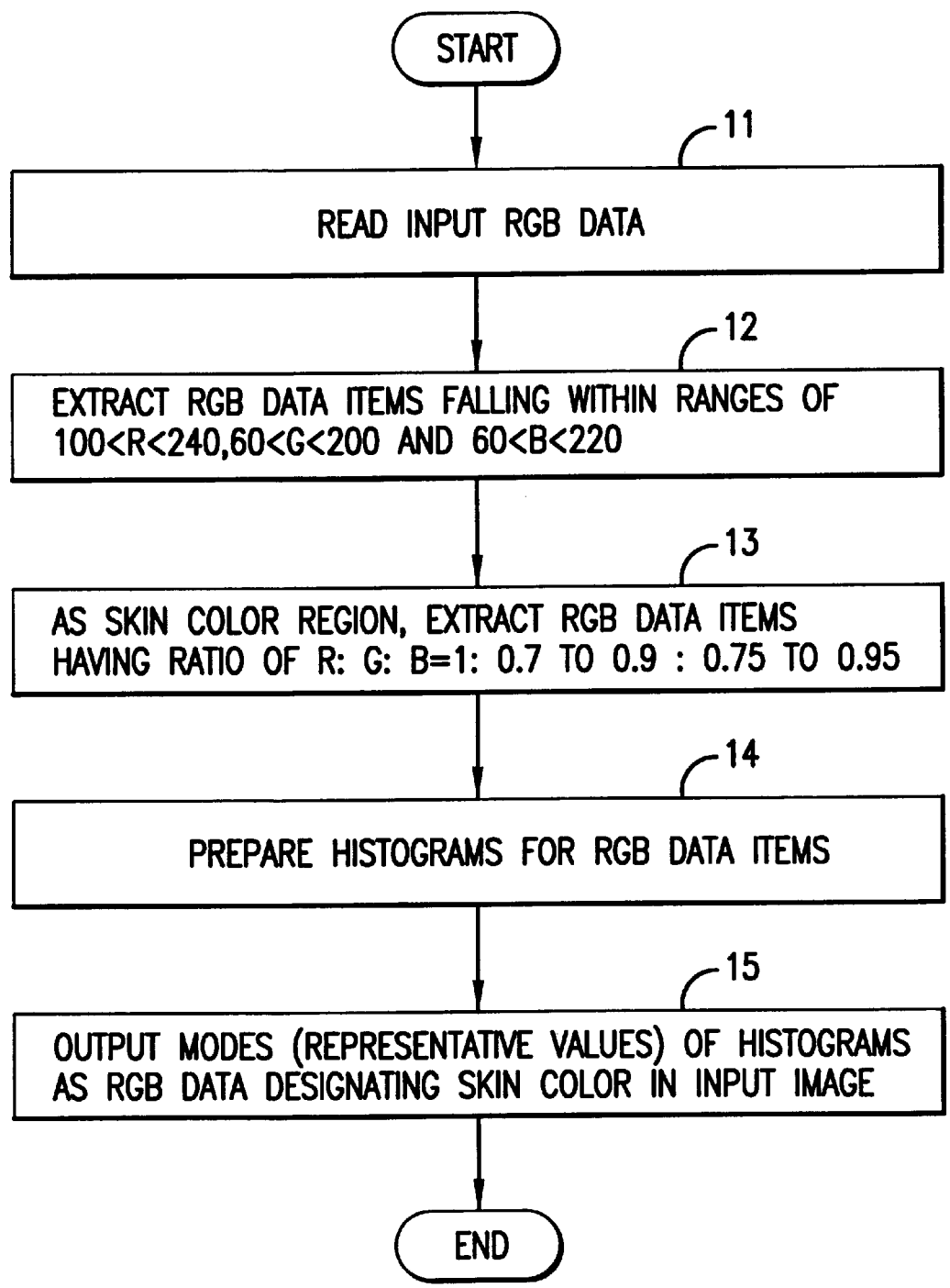
FIG. 8 is a flowchart of steps constituting a characteristic color region extracting routine carried out by characteristic color region extracting means in the image processing apparatus of FIG. 3.

FIG. 8 is a flowchart of steps constituting a characteristic color region extracting routine 10 carried out by the characteristic color region extracting means 231 in the -parameter determining means 230 of FIG. 3. In this example, the skin color region, i.e., one of memory colors, is extracted.

Data ranges and a data item ratio for the skin color region are set in advance for the characteristic color region extracting means 231. In this example, the RGB data is regarded as skin color region data if the data item R comes between 100 and 240, G between 60 and 200, and B between 60 and 220, and if the data item G falls between 0.7 and 0.9, and B between 0.75 and 0.95 with respect to R being set for 1.

In step 11 of the characteristic color region extracting routine 10, the characteristic color region extracting means 231 reads input RGB data. In step 12, the RGB data items that fall within the ranges of 100<R<240, 60<G<200 and 60<B<220 are extracted.

In step 13, the ratio of the RGB data items extracted in step 12 is computed and the RGB data items having the ratio of R:G:B=1:0.7 to 0.9:0.75 to 0.95 are extracted as the skin color region.

Figure 9A:
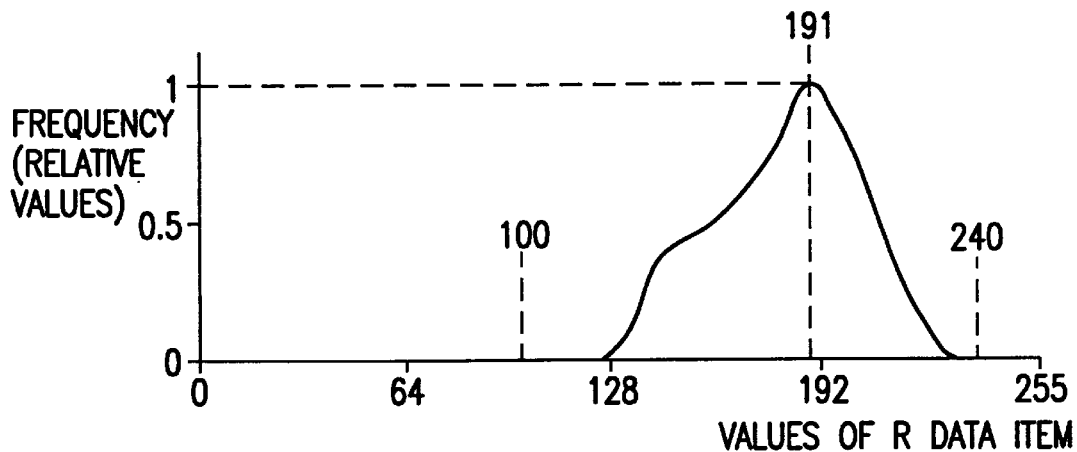
FIGS. 9A, 9B and 9C are views of typical histograms formed upon extraction of characteristic color regions.
Figure 9B:
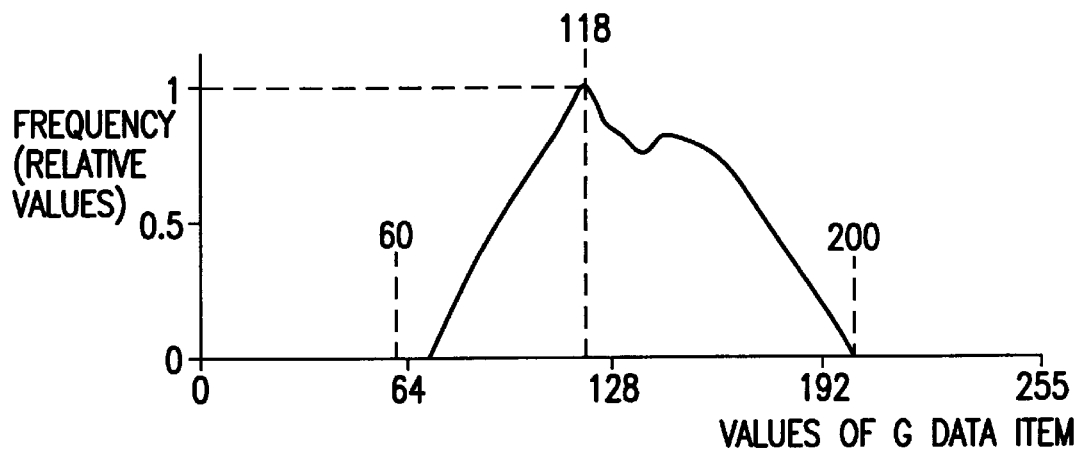
Figure 9C:
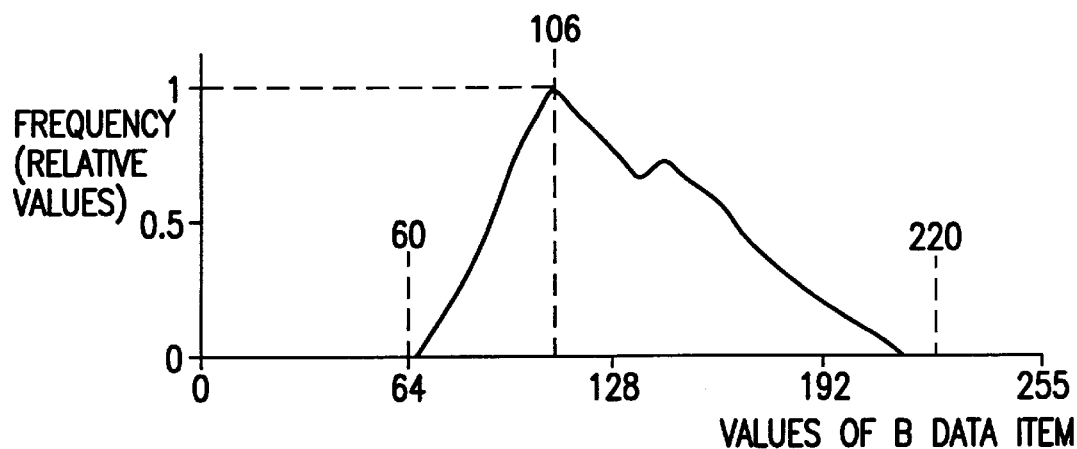

In step 14, histograms for the RGB data items extracted in step 13 are prepared as shown in FIGS. 9A, 9B and 9C. In step 15, a representative value of each of the histograms (specifically the mode, central value or mean value) is output as the RGB data designating the skin color in the input image. This is an example in which modes 191, 118 and 106 are output as shown in FIGS. 9A, 9B and 9C.

In like manner, data ranges and a data item ratio are preset for each of the characteristic colors other than the skin color, whereby the region for each characteristic color is extracted. Where a data item ratio is to be established as described, the data ranges need not be set for all RGB data items; a data range need only be set for at least one data item.

Alternatively, the characteristic color region extracting means 231 may be structured so that an operator can extract characteristic color regions while watching a screen displayed illustratively on a CRT display unit. For example, the operator may extract characteristic color regions interactively using an application program having functions equivalent to those of the automatic selection tool furnished in PhotoShop 3.0J from Adobe Systems.

Where the color reproduction range of the image forming apparatus 300 is expressed by a dodecahedron in the L*a*b* color space as shown in FIGS. 4A and 4B, the characteristic describing means 232 communicates with the image forming apparatus 300. The communicating process sets the characteristic describing means 232 with L*a*b* coordinates of eight vertexes R, G, B, Y, M, C, S and W of the dodecahedron. The coordinates are sent from the characteristic describing means 232 to the output image predicting means 233 as data designating the color reproduction range of the image forming apparatus 300.

Upon power-up or during a user-initiated operation, the image forming apparatus 300 may control image quality as follows: a reference patch is first output to the photosensitive drum 310 in FIG. 2 or onto a sheet of paper. The reference patch is then measured by use of a calorimeter. Operation quantities necessary for image formation are adjusted so that the colorimeter readings will match target values. In such cases, every time the operation quantities are controlled, the characteristic describing means 232 should preferably be set with the L*a*b* coordinates of the eight vertexes R, G, B, Y, M, C, S and W specifying the color reproduction range of the image forming apparatus 300.

The output image predicting means 233 receives from the characteristic describing means 232 the L*a*b* coordinates of the eight vertexes R, G, B, Y, M, C, S and W which define the color reproduction range of the image forming apparatus 300. In response, the output image predicting means 233 simulates color conversion characteristics for the three-dimensional interpolation color converting circuit 211 and color adjusting circuit 213.

In the example above, the lattice points of the three-dimensional interpolation color converting means 211 are supplied as initial values with the L*a*b* coordinates of the eight vertexes R, G, B, Y, M, C, S and W designating the color reproduction range of the image forming apparatus 300. The L*LUT 215, C*LUT 216 and H·LUT 217 of the color adjusting circuit 213 in FIG. 6 are fed with straight lines tilted at 45 degrees each, i.e., output values equal to the input values.

Then the output image predicting means 233 acquires as prediction values the L*C*H coordinates through color conversion. That color conversion is carried out by the three-dimensional interpolation color converting circuit 211 and by the chroma hue converting circuit 214, L*LUT 215, C*LUT 216 and H·LUT 217 in the color adjusting circuit 213 on the RGB data about the characteristic color regions extracted by the characteristic color region extracting means 231.

The lightness deviation computing means 241, chroma deviation computing means 242 and hue deviation computing means 243 compute deviations ΔL, ΔC and ΔH of prediction values L*, C* and H with respect to predetermined settings (desired values) L*o, C*o and Ho through the use of the expressions (10), (11) and (12) below:

$$\Delta L = |L^* - L^*o| \quad (10)$$

$$\Delta C = |C^* - C^*o| \quad (11)$$

$$\Delta H = |H - Ho| \quad (12)$$

In addition, the output image predicting means 233 obtains as prediction values the L*C*H coordinates through a color converting process that is effected by the three-dimensional interpolation color converting circuit 211 and by the chroma hue converting circuit 214, L*LUT 215, C*LUT 216 and H·LUT 217 in the color adjusting circuit 213 on the RGB data set as color gradation data by the evaluation data setting means 234.

Furthermore, the lightness gradation characteristic computing means 244, chroma gradation characteristic computing means 245 and hue linearity computing means 246 compute variances σL, σC and σH of prediction values L*i, C*i and Hi with respect to predetermined settings (ideal values) L*si, C*si and Hsi by use of the expressions (13), (14) and (15) below:

$$\sigma L = \{(L^*0 - L^*s0)^2 + (L^*1 - L^*s1)^2 + \ldots + (L^*n - L^*sn)^2\}^{1/2}/n \quad (13)$$

$$\sigma C = \{(C^*0 - C^*s0)^2 + (C^*1 - C^*s0)^2 + \ldots + (C^*n - C^*sn)^2\}^{1/2}/n \quad (14)$$

$$\sigma H = \{(H0 - Hs0)^2 + (H1 - Hs1)^2 + \ldots + (Hn - Hsn)^2\}^{1/2}/n \quad (15)$$

where "n" represents the number of grades in color gradation data, and "i" denotes any integer between 0 and n. In the above example, n=255.

Figure 10A:
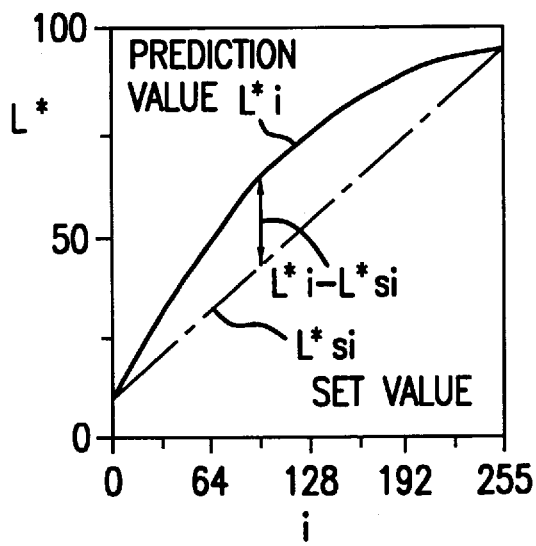
FIGS. 10A, 10B and 10C are graphic representations showing how variance computations are performed by lightness gradation characteristic computing means, by chroma gradation characteristic computing means and by hue linearity computing means in the image processing apparatus of FIG. 3.
Figure 10B:
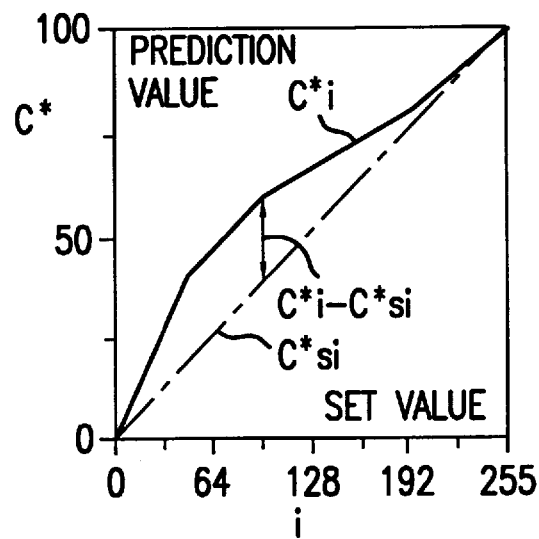
Figure 10C:
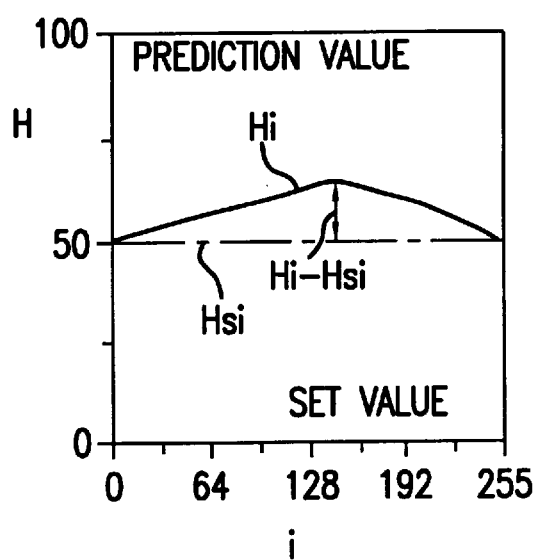

The process in which the variances σL, σC and σH are computed is illustrated in FIGS. 10A, 10B and 10C.

The evaluation value integrating means 235 computes an overall evaluation value Ω of image quality using the following expression:

$$\Omega = (j=1-m)\Sigma(w1j \cdot \Delta Lj + w2j \cdot \Delta Cj + w3j \cdot \Delta Hj) + (q=1-k)\Sigma(w4q \cdot \sigma Lq + w5q \cdot \sigma Cq + w6q \cdot \sigma(Hq)) \quad (16)$$

where, ΔLj, ΔCj and ΔHj are deviations for the respective characteristic colors in which j=1–m, and σLq, σCq and a Hq are variances regarding the color gradation data about the respective colors in which q=1–k. The deviations and variances are thus weighted, added up and integrated.

The term (j=1–m)Σ denotes the total sum ranging from j=1 to j=m. The term (q=1–k)Σ represents the total sum from q=1 to q=k. Values w1j, w2j, w3j, w4q, w5q and w6q are weighting coefficients. If color gradation data is set to comprise red, green, blue, yellow, magenta, cyan and gray as in the example above, then k=7.

In that case, appropriately establish ing the weighting coefficients w1j, w2j, w3j, w4q, w5q and w6q makes it possible to realize color conversion characteristics that will meet the user's preferences.

For example, the skin color, one of the memory colors, is known to have a low tolerance towards hue shift and a relatively high tolerance regarding chroma. In such a case, the weighting coefficient w3j with respect to hue is set to be greater than the weighting coefficient w2j regarding chroma. This provides color conversion characteristics that will minimize hue shift.

The blue of the skies, another memory color, is generally preferred to have a high chroma level. A distinct sky blue is acquired by setting a large weighting coefficient w2j regarding chroma.

It may be desired to have a specific color from among the characteristic colors (e.g., skin color) coincide with a predetermined color. In that case, the need for emphasis on the color in question is met flexibly by setting a large weighting coefficient concerning that color.

Where it is desired to emphasize gradation characteristics, a large weighting coefficient w4q regarding the lightness gradation characteristic need only be set. To meet the need for preventing fused gradation in highly saturated portions, a large weighting coefficient w5q relative to the chroma gradation characteristic may be established.

The parameter changing means 236 receives from the evaluation value integrating means 235 the overall evaluation value Ω defined by the expression (16). In turn, the parameter changing means 236 changes parameters for the three-dimensional interpolation color converting circuit 211 and for the color adjusting circuit 213 until the converging conditions set with the overall evaluation value 0 have been met, as described. In changing the parameters, the parameter changing means 236 causes the output image predicting means 233 and other related components to perform the above-decribed image quality evaluation.

Optimized color converting parameters are obtained by minimizing the overall evaluation value Ω. It follows that the changing of color converting parameters by the parameter changing means 236 may be regarded as a question of nonlinear optimization through the minimizing of the overall evaluation value Ω taken as an objective function.

Of the numerous nonlinear optimization techniques including the method of least squares and direct search method, the simplex method (a variation of the direct search method) is used by the first embodiment. The simplex method is described illustratively in "Nonlinear Optimization" (by J. Kowalik et al., translated into Japanese by Yamamoto et al., Baifu-kan). Suitable techniques other than the simplex method may also be used for nonlinear optimization and the effects are still the same.

With the first embodiment, the color converting parameters are made up of the L*a*b* coordinates constituting the eight vertexes R, G, B, Y, M, C, S and W for the three-dimensional interpolation color converting circuit 211 as well as of the values for the L*LUT 215, C*LUT 216 and H·LUT 217 in the color adjusting circuit 213. To optimize all these parameters, however, would take an inordinately long time because they are numerous.

Instead, the first embodiment optimizes independently the parameters for the three-dimensional interpolation color converting circuit 211 and the parameters for the color adjusting circuit 213 as will be described below. The three-dimensional interpolation color converting circuit 211 makes adjustments in the hue direction regarding characteristic colors, while the L*LUT 215 and C*LUT 216 in the color adjusting circuit 213 adjust light and chroma in terms of gradation.

Figure 11:
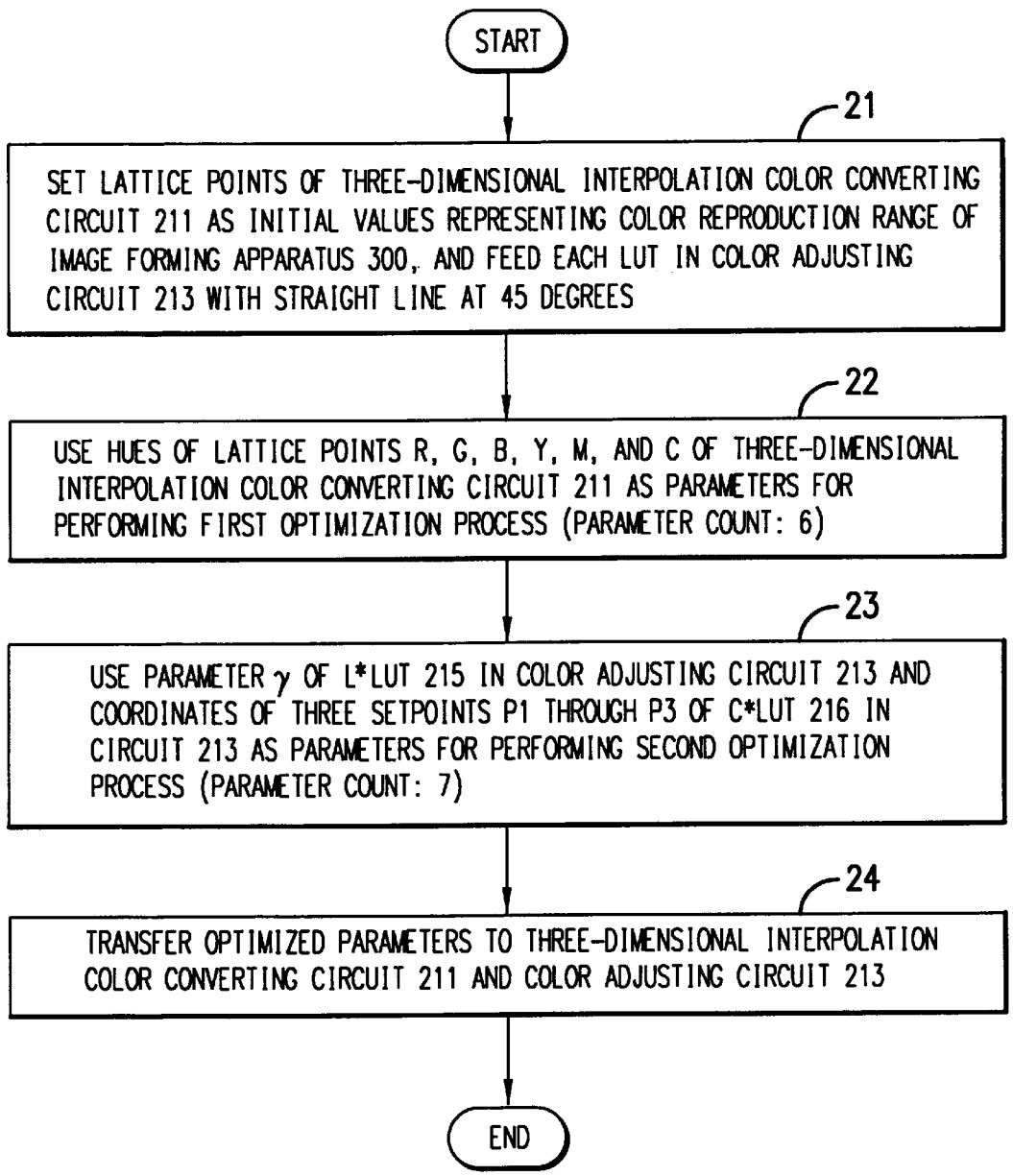
FIG. 11 is a flowchart of steps constituting a parameter changing routine carried out by parameter changing means in the image processing apparatus of FIG. 3.

Specifically, the parameter changing means 236 carries out a parameter changing routine 20 shown in FIG. 11. In step 21, as mentioned earlier, the lattice points of the three-dimensional interpolation color converting circuit 211 are supplied as initial values with the L*a*b* coordinates representing the eight vertexes R, G, B, Y, M, C, S and which define the color reproduction range of the image forming apparatus 300. The L*LUT 215, C*LUT 216 and H·LUT 217 in the color adjusting circuit 213 are fed with straight lines tilted at 45 degrees each.

In step 22, a first optimization process is carried out using the hues of the lattice points R (red), G (green), B (blue), Y (yellow), M (magenta) and C (cyan) as parameters for the three-dimensional interpolation color converting circuit 211.

In the first optimization, the lattice points R, g, B, Y, M and C for the three-dimensional interpolation color converting circuit 211 are changed in terms of hue, whereby the characteristic colors are adjusted in the hue direction. There are six parameters used in the first optimization.

In step 23, a second optimization process is performed using a parameter γ for the L*LUT 215 and parameters made of the coordinates of setpoints P1 through P3 for the C*LUT 216 in the color adjusting circuit 213.

In the second optimization, the parameter γ for the L*LUT 215 is adjusted so as to regulate lightness gradation. The coordinates of the setpoints P1 through P3 for the C*LUT 216 are adjusted to control chroma gradation. There are seven parameters used in the second optimization.

Figure 12A:
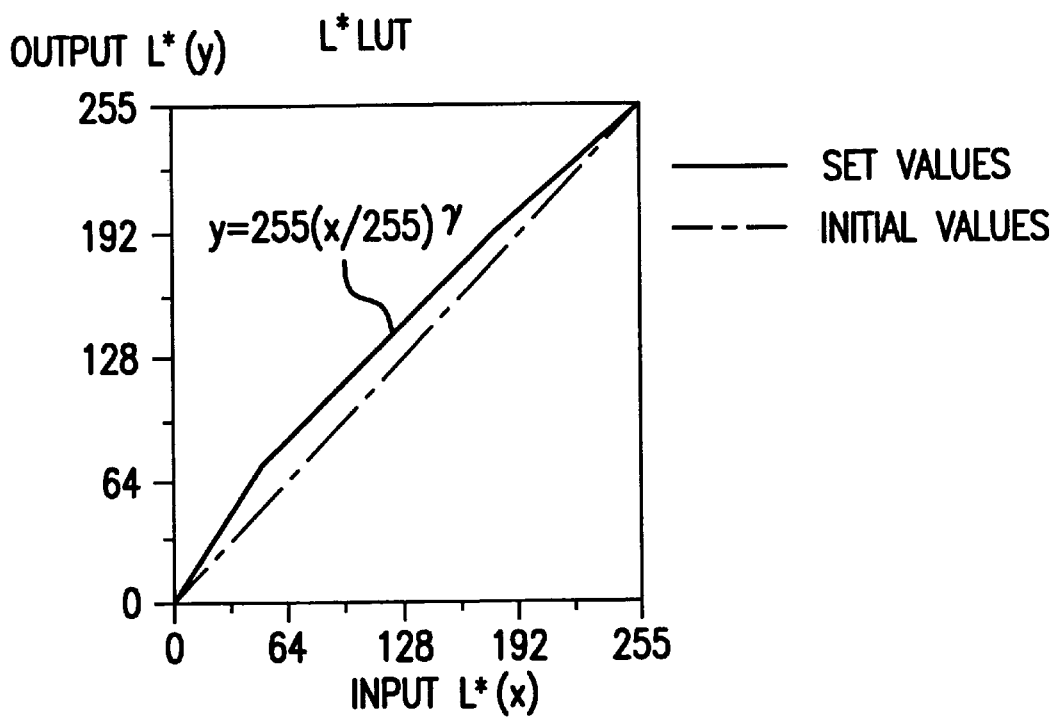
FIGS. 12A and 12B are graphic representations showing optimized parameters of the look-up tables constituting the color adjusting circuit of FIG. 6.
Figure 12B:
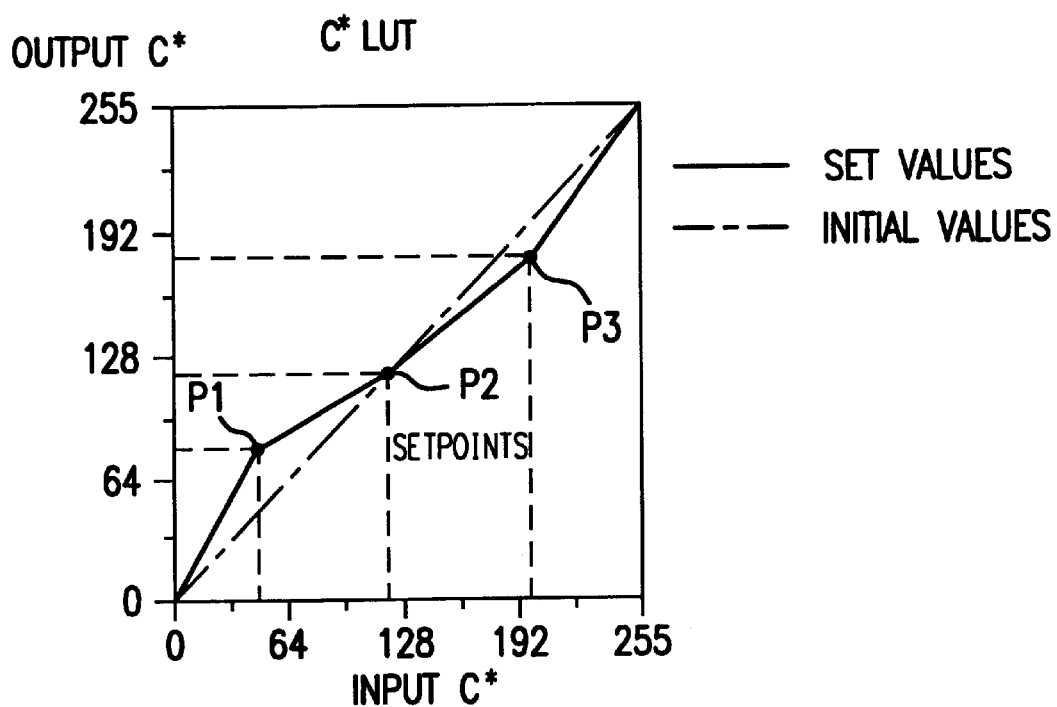

FIG. 12A shows the parameter γ for the L*LUT 215, and FIG. 122 illustrates the three setpoints P1 through P3 for the C*LUT 216. The parameter γ is involved in the following expression:

$$y=255(x/255)^\gamma \qquad (17)$$

where "x" represents input L* data and "y" denotes output L* data for the L*LUT 215. A broken line passing through the three setpoints P1 through P3 is described by the C*LUT 216.

In step 24 following optimization, the optimized parameters are transferred to the three-dimensional interpolation color converting circuit 211 and to the color adjusting circuit 213. This terminates execution of the parameter changing routine.

Instead of describing the setpoints P1 through P3 using a broken line passing therethrough, the C*LUT 216 may interpolate the points P1 through P3 by use of a polynomial or a spline function. The L*LUT 215, as with the C*LUT 216, may have its setpoints furnished in the form of parameters.

When the optimization process above is performed as described, a small number of color converting parameters are optimized and determined at high speed. This allows the image forming apparatus 300 to produce prints in preferred colors at all times.

In the example above, the RGB data is linearly mapped in the L*a*b* color space by the third-dimensional interpolation color converting means 211, and the mapped state is considered to represent initial values for parameter optimization. This enables the optimization process to be carried out unfailingly using only a limited number of characteristic colors to be given to the evaluation function.

The objective function is computed by the evaluation value integrating means 235 weighting and adding up the individual factors for image quality evaluation. Thus suitably adjusting the weighting coefficients makes it possible to reflect the user's preferences in the output image.

The characteristic color region extracting means 231 automatically extracts characteristic color regions. This feature makes it possible always to output, in preferred colors matching the memory colors, those images whose color balances may have been disturbed because they come illustratively from different input devices or from age-deteriorated photographic films.

The three-dimensional interpolation color converting means 211 performs the color converting process of modeling the color reproduction range of the image forming apparatus 300. This feature always permits color reproduction that makes the most of the color reproduction characteristics of the image forming apparatus 300.

Within the color reproduction range of the image forming apparatus 300, linear interpolation is carried out through tetrahedron interpolation. This makes it possible to guarantee the linearity of lightness and chroma gradation as well as the linearity of hue. Because the parameter determining means 230 determines parameters by evaluating gradation characteristics and fused gradation in highly saturated portions, the colors thus reproduced are more striking and more advantageous in gradation than conventionally obtained colors.

(Second Embodiment in the Form of an Image Processing Apparatus)

Figure 13:
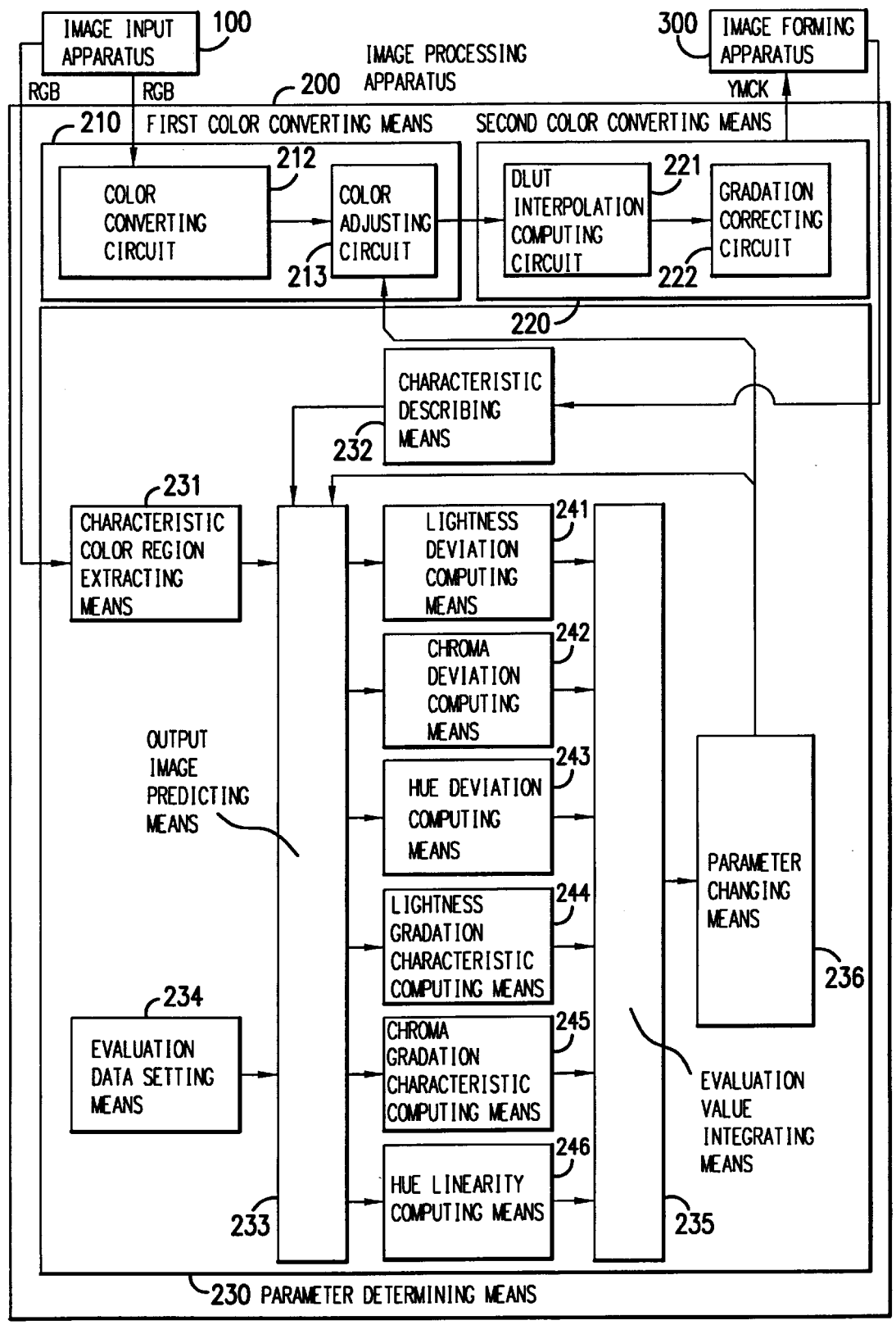
FIG. 13 is a block diagram of an image processing apparatus practiced as a second embodiment of the invention.

FIG. 13 is a block diagram of another example of the image processing apparatus 200 shown in FIG. 1 and practiced as the second embodiment of the invention. The second embodiment is characterized in that the first color converting means 210 utilizes a commonly employed color converting circuit 212 in place of the specialized three-dimensional interpolation color converting circuit 211 described with reference to FIGS. 3 and 6. The circuit is designed to convert input RGB data to L*a*b* data.

The color converting circuit 212 of the second embodiment may be any known color converting circuit as long it converts RGB data into L*a*b* data. Thus the circuit may be any one of a matrix type color converting circuit, a neural network type color converting circuit, a DLUT type color converting circuit and a converting circuit based on defining equations.

The second embodiment adopts a neural network type color converting circuit 212. This type of color converting circuit is disclosed illustratively in Japanese Published Unexamined Patent Application No. Hei 6-95723 and Japanese Published Unexamined Patent Application No. Hei 7-87347.

Figure 14:
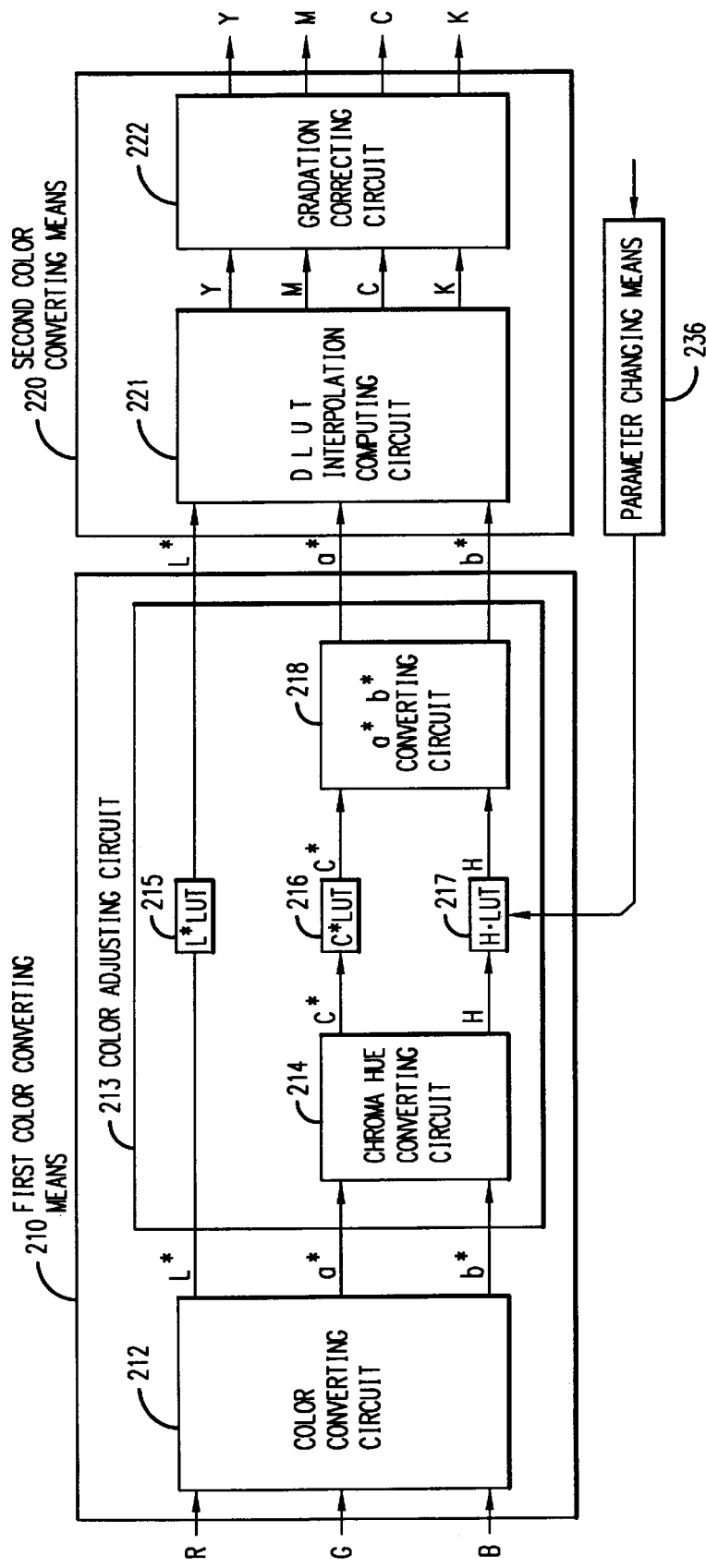
FIG. 14 is a block diagram of a typical color adjusting circuit in the image processing apparatus of FIG. 13.

With the second embodiment, the parameter changing means 236 in the parameter determining means 230 is used to bchange parameters only for the color adjusting circuit 213. As shown in FIG. 14, the color adjusting circuit 213 is allowed to have the same structure as the circuit shown in FIG. 6.

As described with reference to FIG. 1, the input color signals are not limited to RGB data alone. The signals may be constituted by data applicable to any appropriate color space. Illustratively, input data in the CMYK color space, which is the standard color space for printing, may be converted by the color converting circuit 212 into L*a*b* data. In another example, input data in the YCC color space used by the Photo CD may be converted by the color converting circuit 212 into L*a*b* data.

The output image predicting means 233 receives from the characteristic describing means 232 the L*a*b* coordinates of the eight points R, G. B, Y, M, C, S and W designating the color reproduction range of the image forming apparatus 300, the coordinates having been set to the characteristic describing means 232. On the basis of the L*a*b* coordinates thus received, the output image predicting means 233 simulates the color converting characteristics of the color converting circuit 212 and color adjusting circuit 213.

More specifically, the color reproduction range of the image forming apparatus 300 is considered to be represented by a dodecahedron having eight vertexes R, G, B, Y, M, C, S and W. When any value converted by the color converting circuit 212 and color adjusting circuit 213 occurs outside the dodecahedron, a straight line connecting the point represented by that value to the origin of the L*a*b* coordinates is allowed to intersect the surface of the dodecahedron. The point of that intersection is taken as a new value brought about by the color conversion.

As their initial values, the L*LUT 215, C*LUT 216 and H·LUT 217 in the color converting circuit 213 shown in FIG. 14 are supplied with straight lines tilted at 45 degrees each, i.e., output values equal to the input values.

The parameter changing means 236 receives from the evaluation value integrating means 235 the overall evaluation value $\Omega$ defined by the expression (16) above. Until the converging conditions set with the overall evaluation value $\Omega$ have been met, the parameter changing means 236 changes the parameters for the color adjusting circuit 213 so as to let the output image predicting means 233 and other related components perform image quality evaluation.

In this example, the color parameters belong to the L*LUT 215, C*LUT 216 and H·LUT 217 in the color adjusting circuit 213 shown in FIG. 14. These parameters, however, are too many to be all optimized in a short time.

Instead, this example causes the parameters of the color adjusting circuit 213 to be optimized independently in the hue direction and in the lightness and chroma direction as will be described below. That is, the H·LUT 217 in the color adjusting circuit 213 makes adjustments in the hue direction regarding characteristic colors, while the L*LUT 215 and C*LUT 216 in the color adjusting circuit 213 adjust the gradation characteristics of lightness and chroma.

Figure 15:
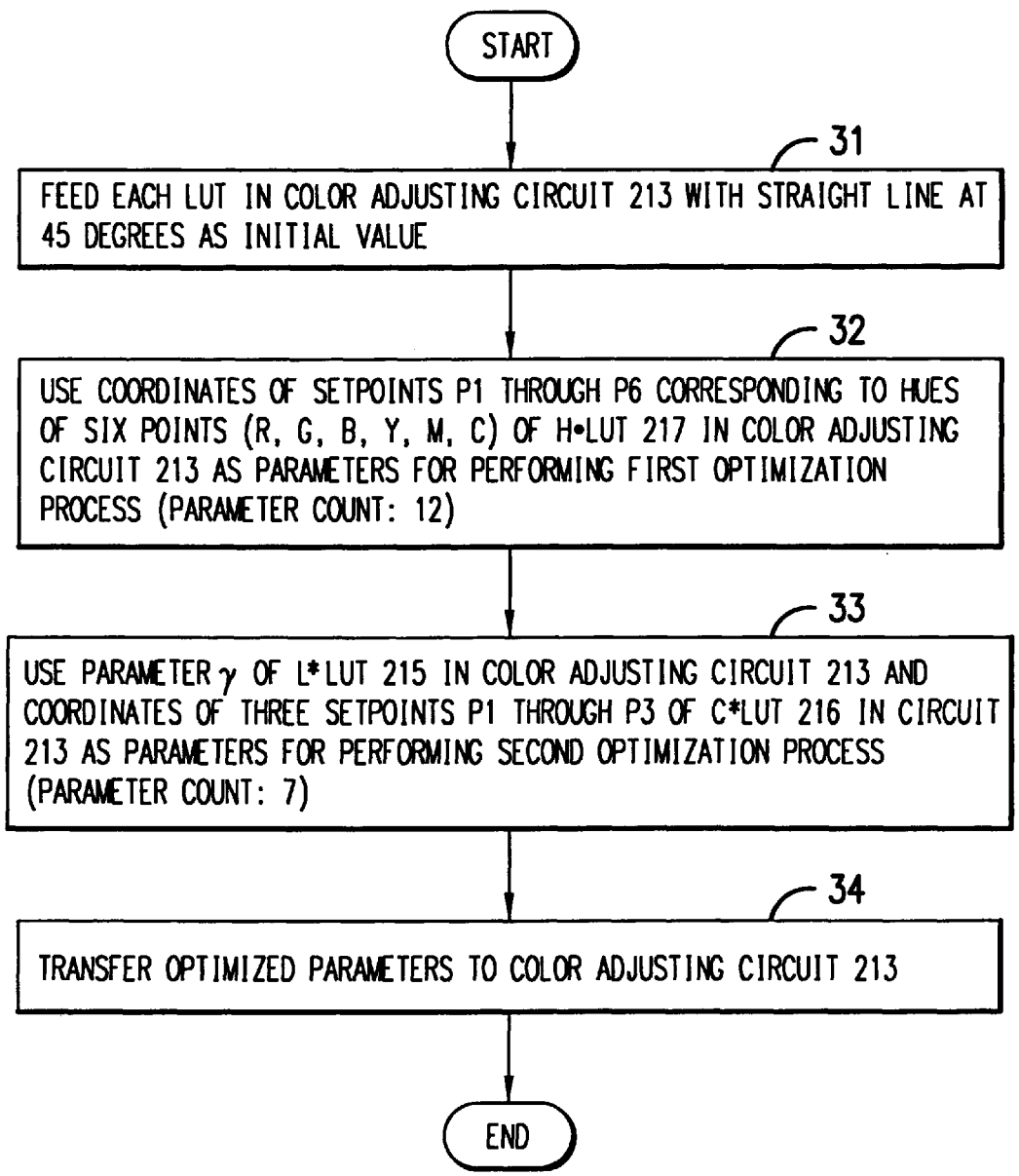
FIG. 15 is a flowchart of steps constituting a parameter changing routine carried out by parameter changing means in the image processing apparatus of FIG. 13.

FIG. 15 is a flowchart of steps constituting a parameter changing routine 30 carried out by the parameter changing means 236. In step 31 of the routine 30, as indicated in FIG. 15 and as described above, the L*LUT 215, C*LUT 216 and H·LUT 217 in the color adjusting circuit 213 are fed with 45-degree-tilted straight lines as their initial values.

In step 32, a first optimization process is carried out using as parameters the coordinates of the setpoints P1 through P6 corresponding in hue to the six points (red, green, blue, yellow, magenta, cyan) of the H·LUT 217 in the color adjusting circuit 213.

Figure 16:
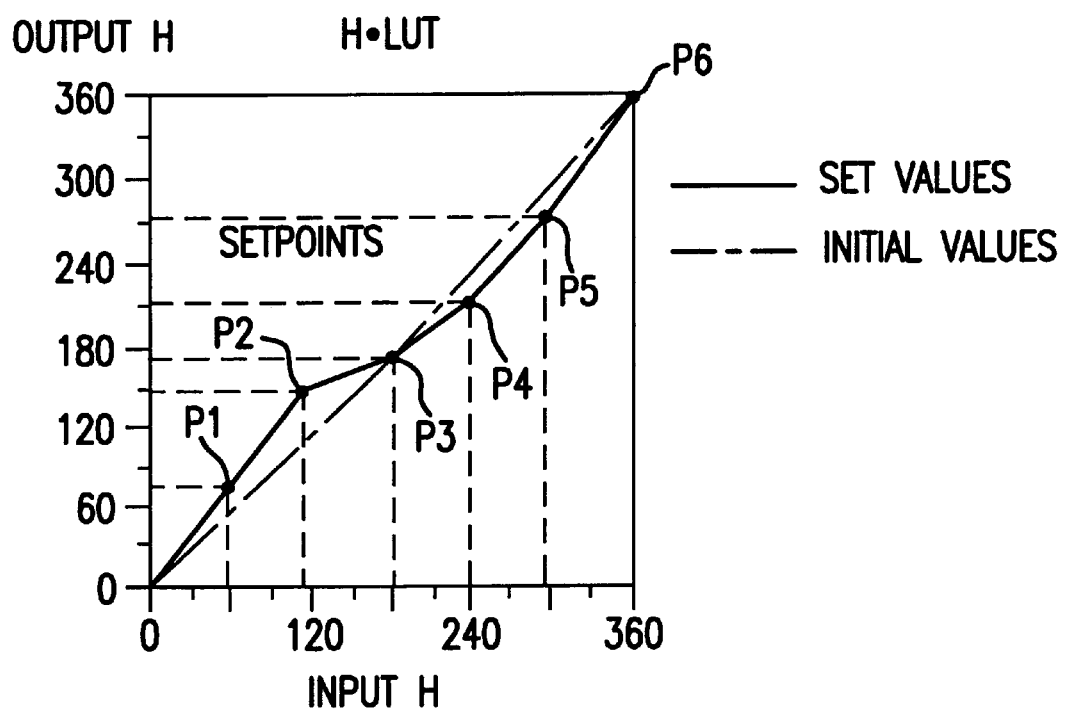
FIG. 16 is a graphic representation showing optimized parameters of look-up tables constituting the color adjusting circuit of FIG. 14.
Figure 17:
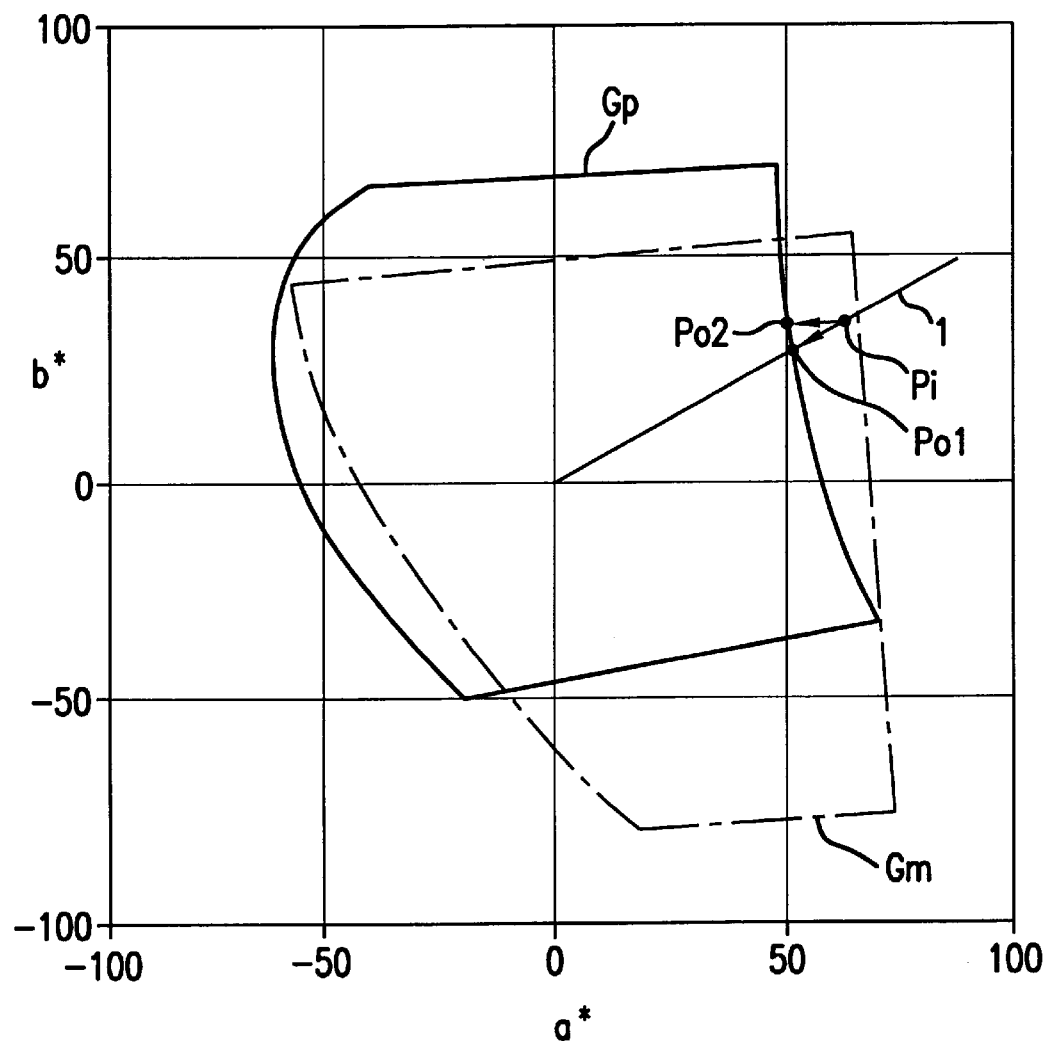
FIG. 17 is a graphic representation illustrating different color reproduction ranges of different devices.
Figures 18A, 18B, 18C:
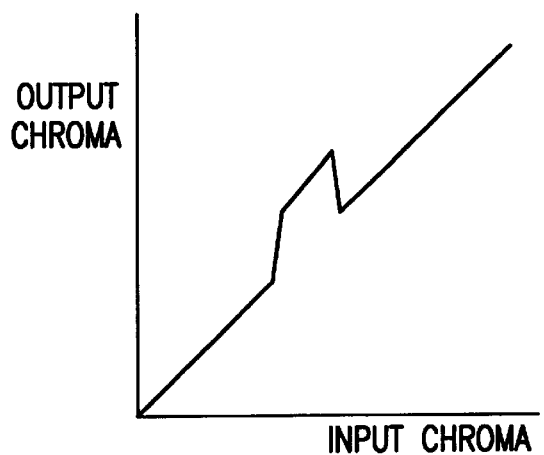
FIGS. 18A, 18B and 18C are graphic representations showing how conventional image processing is performed.

In the first optimization process, the characteristic colors are adjusted in the hue direction by the H·LUT 217. There are 12 parameters involved in the process. FIG. 16 graphically represents the six setpoints P1 through P6 of the H·LUT 217.

In step 33, as in step 23 of the parameter changing routine 20 in FIG. 11 for the example in FIG. 3, a second optimization process is performed using as parameters the parameter γ of the L*LUT 215 in the color adjusting circuit 213 as well as three setpoints P1 through P3 of the C*LUT 216 in the same color adjusting circuit 213.

In the second optimization process, the gradation characteristic of lightness is adjusted by suitably changing the parameter γ of the L*LUT 215; the gradation characteristic of chroma is adjusted by appropriately changing the coordinates of the setpoints P1 through P3 of the C*LUT 216. There are seven parameters involved in the process.

In step 34 following the optimization, the optimized parameters are transferred to the color adjusting circuit 213. This terminates execution of the parameter changing routine.

Instead of describing the setpoints P1 through P6 using a broken line passing therethrough, the H·LUT 217 may interpolate the points P1 through P6 by use of a polynomial or a spline function. The L*LUT 215, as with the C*LUT 216, may have its setpoints furnished in the form of parameters.

When the optimization is performed as described above, a small number of color converting parameters are optimized and determined at high speed.

With the second embodiment, the L*a*b* data converted by the commonly used color converting circuit 212 is color-adjusted by the color converting circuit 213 in accordance with the image quality evaluation value, whereby preferred colors are reproduced. This permits reproduction of images in preferred colors in diverse kinds of input color space.

Furthermore, the second embodiment sets the color converting circuit 212 in such a way that causes print colors based on L*a*b* data to coincide with displayed colors derived from RGB data through the use of the conventional Gamut compression techniques. In that state, the color adjusting circuit 213 is adjusted to attain preferred colors. This reproduces visually desirable colors that are fairly close to the colors shown on the display unit.

The major benefits of the present invention are summarized as follows: according to the invention, the color reproduction characteristics of the output image are evaluated from the characteristics of input image data and from the color reproduction characteristics of the image forming apparatus. The color reproduction characteristics thus evaluated are used as the basis for automatically determining optimum color converting parameters. This allows the image forming apparatus always to produce prints in preferred colors representing any input image.

The inventive apparatus evaluates concurrently two factors that are often mutually exclusive: coincidence of characteristic colors with preferred colors, and tendency toward chroma fusion in highly saturated portions. Where the evaluation process yields a suitable trade-off, there occur few instances in which characteristic colors are allowed to match preferred colors only at the expense of chroma fusion in highly saturated portions or in which characteristic colors are left to deteriorate in chroma so as to avoid chroma fusion in highly saturated portions. Whereas such cases have plagued conventional image processing apparatuses, the inventive apparatus provides the kind of image processing which satisfies the two requirements at the same time.

The inventive apparatus automatically extracts characteristic color regions such as memory colors. In so doing, the apparatus always outputs, in preferred colors matching the memory colors, those images whose color balances may have been disturbed because they come illustratively from different input devices or from age-deteriorated photographic films.

According to the invention, the parameters of the color converting means having continuous converting characteristics are optimized. The parameters thus optimized are finalized after gradation characteristics and chroma fusion in highly saturated portions have been evaluated. This feature, unlike conventional setups, eliminates any discontinuity between the memory color regions on the one hand and the remaining regions on the other hand, and suppresses any false contour in gradation.

Because the inventive apparatus weighs and adds up individual factors of image quality evaluation in computing the objective function, it is possible to reflect the user's preferences in the output image by adjusting appropriate weighting coefficients.

The inventive apparatus makes it possible to describe the color converting process in a limited number of parameters. This means that the color converting parameters for reproducing preferred colors are optimized unfailingly at high speed.

The specialized three-dimensional interpolation color converting circuit of the invention performs the color converting process of modeling the color reproduction range of the image forming apparatus. This feature always permits color reproduction that makes the most of the color reproduction characteristics of the image forming apparatus. Within the color reproduction range of the image forming apparatus, linear interpolation is carried out through tetrahedron interpolation. This guarantees the linearity of lightness and chroma gradation as well as the linearity of hue.

According to the invention, the color converting parameters are determined by evaluating gradation characteristics and fused gradation in highly saturated portions. The colors thus reproduced are more striking and more advantageous in gradation than conventionally obtained colors.

The specialized three-dimensional interpolation color converting circuit of the invention performs the optimization process using as its initial values RGB data being linearly mapped in the L*a*b* color space. This makes it possible to carry out the optimization unfailingly with only a small number of characteristic colors given to the evaluation function. After such optimization, the color converting characteristics are free of defects.

As many apparently different embodiments of this invention may be made without departing from the spirit and scope thereof, it is to be understood that the invention is not limited to the specific embodiments thereof except as defined in the appended claims.

What is claimed is:

1. An image processing apparatus for converting input color image signals to image recording signals to be sent to an image forming apparatus, said image processing apparatus comprising:

first color converting means for converting said input color image signals to three-variable color signals independent of devices; second color converting means for converting said three-variable color signals to said image recording signals; and parameter determining means for determining parameters of said first color converting means and for inputting said parameters to said first color converting means;

said parameter determining means determining said parameters so as to make characteristic colors in said input color image signals coincide with predetermined colors and to maintain linearities of color reproduction characteristics of an output image from said image forming apparatus.

2. An image processing apparatus according to claim 1, wherein said parameter determining means comprises:

characteristic describing means for describing color reproduction characteristics of said image forming apparatus;

characteristic color region extracting means for extracting characteristic color regions from said input color image signals;

evaluation data setting means for setting evaluation data for evaluating linearities of color reproduction characteristics of said output image;

characteristic color evaluating and predicting means for using data described in said characteristic describing means in order to predict and evaluate output colors of said image forming apparatus regarding the regions extracted by said characteristic color region extracting means;

linearity predicting and evaluating means for using the data described in said characteristic describing means in order to predict and evaluate output colors of said image forming apparatus regarding evaluation data set by said evaluation data setting means;

evaluation value integrating means for integrating an evaluation value from said characteristic color predicting and evaluating means and an evaluation value from said linearity predicting and evaluating means; and parameter changing means for changing parameters of said first color converting means on the basis of an overall evaluation value from said evaluation value integrating means.

3. An image processing apparatus according to claim 1, wherein said characteristic colors are memory skin colors.

4. An image processing apparatus according to claim 2, wherein said characteristic color region extracting means extracts color image signals from specific ranges of said input color image signals, said specific ranges being constituted by a data value range of at least one color signal as well as by a data value ratio range regarding the color signals that may be involved, said character color region extracting means further preparing a histogram for each of said color signals regarding the extracted color image signals, whereby representative values of the histograms are output as signals denoting said characteristic color regions.

5. An image processing apparatus according to claim 4, wherein the representative value of each of said histograms is any one of a mode, a median and a mean of the histogram in question.

6. An image processing apparatus according to claim 2, wherein said characteristic color predicting and evaluating means outputs as said evaluation values deviations between predicted output colors of said image forming apparatus regarding the regions extracted by said characteristic color region extracting means on the one hand, and predetermined characteristic colors on the other hand.

7. An image processing apparatus according to claim 6, wherein said deviations include deviations in terms of lightness, chroma and hue.

8. An image processing apparatus according to claim 1, wherein said linearities include linearity of a lightness gradation characteristic, linearity of a chroma gradation characteristic and linearity of hues.

9. An image processing apparatus according to claim 2, wherein said linearity predicting and evaluating means outputs variances from predetermined ideal values as said evaluation values, said variances being related to predicted output colors of said image forming apparatus regarding the evaluation data set by said evaluation data setting means.

10. An image processing apparatus according to claim 2, wherein said evaluation data includes color gradation data about red, green, blue, yellow, magenta, cyan and gray.

11. An image processing apparatus according to claim 2, wherein said evaluation value integrating means weighs and adds up individual evaluation values furnished by said characteristic color predicting and evaluating means as well as individual evaluation values provided by said linearity predicting and evaluating means.

12. An image processing apparatus according to claim 2, wherein said characteristic describing means describes a color reproduction range of said image forming apparatus as a color reproduction characteristic of said image forming apparatus.

13. An image processing apparatus according to claim 1, wherein said first color converting means comprises a color converting part and color adjusting means, said color converting part converting said input color image signals into a three-variable color space independent of devices, said color adjusting means performing color adjustments in said three-variable color space.

14. An image processing apparatus according to claim 13, wherein said three-variable color space is a CIE-L*a*b* color space.

15. An image processing apparatus according to claim 13, wherein said color converting part is three-dimensional interpolation color converting means for expressing a color reproduction range of said image forming apparatus by use of a dodecahedron having vertexes constituted by maximum density points of red, green, blue, yellow, magenta, cyan and gray as well as by a white point of an image forming medium utilized by said image forming apparatus, said three-dimensional interpolation color converting means further dividing said dodecahedron into six tetrahedrons each including the maximum density point of gray and the white point of said image forming medium, said three-dimensional interpolation color converting means further performing interpolation inside each of said tetrahedrons so as to convert said input color image signals into a uniform color space.

16. An image processing apparatus according to claim 13, wherein said color converting part is any one of a matrix type color converting circuit, a neural network type color converting circuit and a direct look-up table type color converting circuit for converting said input color image signals into a uniform color space.

17. An image processing apparatus according to claim 13, wherein said color converting part is a color converting circuit for carrying out computations based on definition expressions so as to convert said input color image signals into a uniform color space.

18. An image processing apparatus according to claim 13, wherein said color adjusting means converts color signals in a uniform color space into lightness, chroma and hue for color adjustment.

19. An image processing apparatus according to claim 18, wherein said color adjusting means performs color adjustment using look-up tables assigned to lightness, chroma and hue.

20. An image processing apparatus according to claim 2, wherein said parameter changing means changes parameters of said first color converting means so as to minimize said overall evaluation value from sa id evaluation value integrating means.

21. An image processing apparatus according to claim 20, wherein said parameter changing means optimizes parameters of said first color converting means using as an objective function said overall evaluation value from said evaluation value integrating means for nonlinear optimization.

22. An image processing apparatus according to claim 21, wherein said nonlinear optimization is carried out by use of a simplex method.

23. An image processing apparatus according to claim 19, wherein the look-up tables assigned by said color adjusting means to lightness, chroma and hue are used as the parameters to be determined by said parameter determining means for said first color converting means.

24. An image processing apparatus according to claim 23, wherein at least one coordinate from the look-up table assigned for hue adjustment is used as parameters for performing a first optimization process, and wherein at least one coordinate from each of the look-up tables assigned for lightness and hue adjustment is used as parameters for carrying out a second optimization process.

25. An image processing apparatus according to claim 24, wherein initial values of the look-up tables are straight lines tilted at 45 degrees each.

26. An image processing apparatus according to claim 15, wherein said color adjusting means converts color signals in a uniform color space into lightness, chroma and hue for color adjustment, and resorts to a look-up table for each of lightness and chroma for further adjustment.

27. An image processing apparatus according to claim 26, wherein the coordinates of the vertexes of said dodecahedron and the look-up tables assigned by said color adjusting means to lightness and hue are used as the parameters to be determined by said parameter determining means for said first color converting means.

28. An image processing apparatus according to claim 27, wherein the hues of the coordinates representing the vertexes of said dodecahedron are used as parameters for performing a first optimization process, and wherein at least one coordinate from each of the look-up tables assigned for lightness and hue adjustment is used as parameters for carrying out a second optimization process.

29. An image processing apparatus according to claim 28, wherein initial values of the coordinates representing the vertexes of said dodecahedron constitute a color reproduction range of said image forming apparatus, and wherein initial values of each of said look-up tables are straight lines tilted at 45 degrees each.

30. An image processing apparatus according to claim 1, wherein said second color converting means is any one of a direct look-up table type color converting circuit, a matrix type color converting circuit and a neural network type color converting circuit.

31. An image processing apparatus according to claim 1, wherein said input color image signals are composed of RGB image data made up of red, green and blue image data items.

32. An image processing apparatus according to claim 1, wherein said input color image signals are composed of image data acquired by scanning any piece of photographic films and printed matter.

33. An image processing apparatus according to claim 1, wherein said input color image signals are composed of image data acquired from a digital still camera.

* * * * *